(12) United States Patent
Schuehler et al.

(10) Patent No.: US 7,711,844 B2
(45) Date of Patent: May 4, 2010

(54) TCP-SPLITTER: RELIABLE PACKET MONITORING METHODS AND APPARATUS FOR HIGH SPEED NETWORKS

(75) Inventors: David V. Schuehler, St. Louis, MO (US); John W. Lockwood, St. Louis, MO (US)

(73) Assignee: Washington University of St. Louis, St. Louis, MO (US)

( * ) Notice: Subject to any disclaimer, the term of this patent is extended or adjusted under 35 U.S.C. 154(b) by 2220 days.

(21) Appl. No.: 10/222,307

(22) Filed: Aug. 15, 2002

(65) Prior Publication Data

US 2003/0177253 A1    Sep. 18, 2003

(51) Int. Cl.
G06F 15/173    (2006.01)
(52) U.S. Cl. .................. 709/238; 709/223; 709/224; 709/236
(58) Field of Classification Search ........... 709/223, 709/224, 236, 238
See application file for complete search history.

(56) References Cited

U.S. PATENT DOCUMENTS

| | | |
|---|---|---|
| 3,601,808 A | 8/1971 | Vlack |
| 3,611,314 A | 10/1971 | Pritchard, Jr. et al. |
| 3,729,712 A | 4/1973 | Glassman |
| 3,824,375 A | 7/1974 | Gross et al. |
| 3,848,235 A | 11/1974 | Lewis et al. |
| 3,906,455 A | 9/1975 | Houston et al. |
| 4,081,607 A | 3/1978 | Vitols |
| 4,298,898 A | 11/1981 | Cardot |

(Continued)

FOREIGN PATENT DOCUMENTS

EP    0880088    11/1998

(Continued)

OTHER PUBLICATIONS

Anerousis, et al., "Using the AT&T Labs PacketScope for Internet Measurement, Design, and Performance Analysis", Network and Distributed Systems Research Laboratory, AT&T Labs-Research, Florham, Park, NJ, Oct. 1997.

(Continued)

*Primary Examiner*—Nathan Flynn
*Assistant Examiner*—Mohamed Wasel
(74) *Attorney, Agent, or Firm*—Edward J. Radlo; Radlo & Su LLP

(57) ABSTRACT

A method for obtaining data while facilitating keeping a minimum amount of state is provided. The method includes receiving at a first device an Internet Protocol (IP) frame sent from a second device to a third device wherein the first device is in a flow path between the second and third devices, the first device including at least one of an Application Specific Integrated Circuit (ASIC) and a Field Programmable Gate Array FPGA. The method also includes removing an embedded stream-oriented protocol frame including a header and a data packet from the received IP frame with at least one of the ASIC and the FPGA, and determining a validity of a checksum of the removed steam-oriented protocol header. The method also includes dropping the IP frame when the checksum is invalid, supplying a client application with data from the removed protocol frame when the checksum is valid, and sending an IP frame including the removed stream-oriented protocol frame to the third device from the first device when the checksum is valid.

15 Claims, 6 Drawing Sheets

U.S. PATENT DOCUMENTS

| | | |
|---|---|---|
| 4,314,356 A | 2/1982 | Scarbrough |
| 4,385,393 A | 5/1983 | Chaure et al. |
| 4,464,718 A | 8/1984 | Dixon et al. |
| 4,550,436 A | 10/1985 | Freeman et al. |
| 4,823,306 A | 4/1989 | Barbic et al. |
| 4,941,178 A | 7/1990 | Chuang |
| 5,023,910 A | 6/1991 | Thomson |
| 5,050,075 A | 9/1991 | Herman et al. |
| 5,077,665 A | 12/1991 | Silverman et al. |
| 5,101,424 A | 3/1992 | Clayton et al. |
| 5,126,936 A | 6/1992 | Champion et al. |
| 5,140,692 A | 8/1992 | Morita |
| 5,163,131 A | 11/1992 | Row et al. |
| 5,179,626 A | 1/1993 | Thomson |
| 5,226,165 A | 7/1993 | Martin |
| 5,243,655 A | 9/1993 | Wang |
| 5,249,292 A | 9/1993 | Chiappa |
| 5,255,136 A | 10/1993 | Machado et al. |
| 5,265,065 A | 11/1993 | Turtle |
| 5,270,922 A | 12/1993 | Higgins |
| 5,274,679 A | 12/1993 | Abe et al. |
| 5,319,776 A | 6/1994 | Hile et al. |
| 5,327,521 A | 7/1994 | Savic et al. |
| 5,339,411 A | 8/1994 | Haton, Jr. et al. |
| 5,347,634 A | 9/1994 | Herrell et al. |
| 5,371,794 A | 12/1994 | Diffie et al. |
| 5,388,259 A | 2/1995 | Fleischman et al. |
| 5,396,253 A | 3/1995 | Chia |
| 5,404,411 A | 4/1995 | Banton et al. |
| 5,418,951 A | 5/1995 | Damashek |
| 5,421,028 A | 5/1995 | Swanson |
| 5,432,822 A | 7/1995 | Kaewell, Jr. |
| 5,440,723 A | 8/1995 | Arnold et al. |
| 5,461,712 A | 10/1995 | Chelstowski et al. |
| 5,463,701 A | 10/1995 | Kantner et al. |
| 5,465,353 A | 11/1995 | Hull et al. |
| 5,481,735 A | 1/1996 | Mortensen et al. |
| 5,487,151 A | 1/1996 | Kikuchi et al. |
| 5,488,725 A | 1/1996 | Turtle et al. |
| 5,497,488 A | 3/1996 | Akizawa et al. |
| 5,544,352 A | 8/1996 | Egger |
| 5,546,578 A | 8/1996 | Takada |
| 5,629,980 A | 5/1997 | Stefik et al. |
| 5,651,125 A | 7/1997 | Witt et al. |
| 5,687,297 A | 11/1997 | Coonan et al. |
| 5,701,464 A | 12/1997 | Aucsmith |
| 5,710,757 A | 1/1998 | May |
| 5,721,898 A | 2/1998 | Beardsley et al. |
| 5,740,244 A | 4/1998 | Indeck et al. |
| 5,740,466 A | 4/1998 | Geldman et al. |
| 5,761,431 A | 6/1998 | Gross et al. |
| 5,774,835 A | 6/1998 | Ozawa |
| 5,774,839 A | 6/1998 | Shlomot |
| 5,781,772 A | 7/1998 | Wilkinson, III |
| 5,781,921 A | 7/1998 | Nichols |
| 5,805,832 A | 9/1998 | Brown et al. |
| 5,813,000 A | 9/1998 | Furlani |
| 5,819,273 A | 10/1998 | Vora et al. |
| 5,819,290 A | 10/1998 | Fujita |
| 5,826,075 A | 10/1998 | Bealkowski et al. |
| 5,864,738 A | 1/1999 | Kessler et al. |
| 5,870,730 A | 2/1999 | Furuya et al. |
| 5,884,286 A | 3/1999 | Daughtery, III |
| 5,886,701 A | 3/1999 | Chauvin et al. |
| 5,913,211 A | 6/1999 | Nitta |
| 5,930,753 A | 7/1999 | Potamianos et al. |
| 5,943,421 A | 8/1999 | Grabon |
| 5,943,429 A | 8/1999 | Handal |
| 5,974,414 A | 10/1999 | Stanczak et al. |
| 5,978,801 A | 11/1999 | Yuasa |
| 5,987,432 A | 11/1999 | Zusman et al. |
| 5,991,881 A | 11/1999 | Conklin et al. |
| 5,995,963 A | 11/1999 | Nanba et al. |
| 6,023,760 A | 2/2000 | Kartunnen |
| 6,028,939 A | 2/2000 | Yin |
| 6,044,407 A | 3/2000 | Jones et al. |
| 6,058,391 A | 5/2000 | Gardner |
| 6,061,662 A | 5/2000 | Makivic |
| 6,067,569 A | 5/2000 | Khaki et al. |
| 6,070,172 A | 5/2000 | Lowe |
| 6,073,160 A | 6/2000 | Grantham et al. |
| 6,105,067 A | 8/2000 | Batra |
| 6,108,782 A | 8/2000 | Fletcher et al. |
| 6,112,181 A | 8/2000 | Shear et al. |
| 6,115,751 A | 9/2000 | Tam et al. |
| 6,124,844 A | 9/2000 | Ilbery |
| 6,134,551 A | 10/2000 | Aucsmith |
| 6,138,176 A | 10/2000 | McDonald et al. |
| RE36,946 E | 11/2000 | Diffie et al. |
| 6,147,976 A | 11/2000 | Shand et al. |
| 6,169,969 B1 | 1/2001 | Cohen |
| 6,173,276 B1 | 1/2001 | Kant et al. |
| 6,175,874 B1 | 1/2001 | Imai et al. |
| 6,205,148 B1 | 3/2001 | Takahashi et al. |
| 6,216,173 B1 | 4/2001 | Jones et al. |
| 6,219,786 B1 | 4/2001 | Cunningham et al. |
| 6,226,676 B1 | 5/2001 | Crump et al. |
| 6,233,618 B1 | 5/2001 | Shannon |
| 6,233,684 B1 | 5/2001 | Stefik et al. |
| 6,237,028 B1 | 5/2001 | Jackson |
| 6,259,909 B1 | 7/2001 | Ratayczak et al. |
| 6,263,321 B1 | 7/2001 | Daughtery |
| 6,279,113 B1 | 8/2001 | Vaidya |
| 6,317,795 B1 | 11/2001 | Malkin et al. |
| 6,336,150 B1 | 1/2002 | Ellis et al. |
| 6,343,324 B1 | 1/2002 | Hubis et al. |
| 6,363,384 B1 | 3/2002 | Cookmeyer, II et al. |
| 6,370,645 B1 | 4/2002 | Lee |
| 6,377,942 B1 | 4/2002 | Hinsley |
| 6,381,242 B1 | 4/2002 | Maher, III et al. |
| 6,389,532 B1 | 5/2002 | Gupta et al. |
| 6,397,259 B1 | 5/2002 | Lincke et al. |
| 6,397,335 B1 | 5/2002 | Franczek et al. |
| 6,412,000 B1 | 6/2002 | Riddle et al. |
| 6,418,419 B1 | 7/2002 | Nieboer et al. |
| 6,430,272 B1 | 8/2002 | Maruyama et al. |
| 6,456,632 B1 | 9/2002 | Baum et al. |
| 6,456,982 B1 | 9/2002 | Pilipovic |
| 6,463,474 B1 | 10/2002 | Fuh et al. |
| 6,499,107 B1 | 12/2002 | Gleichauf et al. |
| 6,535,868 B1 | 3/2003 | Galeazzi et al. |
| 6,546,375 B1 | 4/2003 | Pang et al. |
| 6,564,263 B1 | 5/2003 | Bergman et al. |
| 6,578,147 B1 | 6/2003 | Shanklin et al. |
| 6,628,652 B1 * | 9/2003 | Chrin et al. ................. 370/386 |
| 6,643,717 B1 | 11/2003 | Rustad et al. |
| 6,704,816 B1 | 3/2004 | Burke |
| 6,711,558 B1 | 3/2004 | Indeck et al. |
| 6,728,929 B1 * | 4/2004 | Luong ....................... 714/807 |
| 6,765,918 B1 | 7/2004 | Dixon et al. |
| 6,772,136 B2 | 8/2004 | Kant et al. |
| 6,772,345 B1 | 8/2004 | Shetty |
| 6,775,290 B1 | 8/2004 | Merchant et al. |
| 6,778,968 B1 | 8/2004 | Gulati |
| 6,785,677 B1 | 8/2004 | Fritchman |
| 6,804,667 B1 | 10/2004 | Martin |
| 6,807,156 B1 | 10/2004 | Veres et al. |
| 6,850,906 B1 | 2/2005 | Chadha et al. |
| 6,856,981 B2 | 2/2005 | Wyschogrod et al. |
| 6,870,837 B2 | 3/2005 | Ho et al. |
| 6,877,044 B2 | 4/2005 | Lo et al. |
| 6,886,103 B1 | 4/2005 | Brustoloni et al. |
| 6,901,461 B2 | 5/2005 | Bennett |
| 6,928,549 B2 | 8/2005 | Brock et al. |

| | | |
|---|---|---|
| 6,931,408 B2 | 8/2005 | Adams et al. |
| 6,944,168 B2 | 9/2005 | Paatela et al. |
| 6,978,223 B2 | 12/2005 | Milliken |
| 6,981,054 B1 | 12/2005 | Krishna |
| 7,019,674 B2 | 3/2006 | Cadambi et al. |
| 7,024,384 B2 | 4/2006 | Daughter, III |
| 7,046,848 B1 | 5/2006 | Olcott |
| 7,065,475 B1 | 6/2006 | Brundobler |
| 7,065,482 B2 | 6/2006 | Shorey et al. |
| 7,093,023 B2 | 8/2006 | Lockwood et al. |
| 7,103,569 B1 | 9/2006 | Groveman et al. |
| 7,103,799 B2 | 9/2006 | Dixon |
| 7,117,370 B2 | 10/2006 | Khan et al. |
| 7,127,510 B2 | 10/2006 | Yoda et al. |
| 7,139,743 B2 | 11/2006 | Indeck et al. |
| 7,149,715 B2 | 12/2006 | Browne et al. |
| 7,167,980 B2 | 1/2007 | Chiu |
| 7,181,437 B2 | 2/2007 | Indeck et al. |
| 7,181,608 B2 | 2/2007 | Fallon et al. |
| 7,181,765 B2 | 2/2007 | Patel et al. |
| 7,191,233 B2 | 3/2007 | Miller |
| 7,251,629 B1 | 7/2007 | Marynowski et al. |
| 7,286,564 B2 | 10/2007 | Roberts |
| 7,305,383 B1 | 12/2007 | Kubesh et al. |
| 7,305,391 B2 | 12/2007 | Wyschogrod et al. |
| 7,308,715 B2 | 12/2007 | Gupta et al. |
| 7,353,267 B1 | 4/2008 | Cunningham et al. |
| 7,363,277 B1 | 4/2008 | Dutta et al. |
| 7,408,932 B2 | 8/2008 | Kounavis et al. |
| 7,480,253 B1 | 1/2009 | Allan |
| 7,565,525 B2 | 7/2009 | Vorbach et al. |
| 2001/0014093 A1 | 8/2001 | Yoda et al. |
| 2001/0052038 A1 | 12/2001 | Fallon et al. |
| 2001/0056547 A1 | 12/2001 | Dixon |
| 2002/0031125 A1 | 3/2002 | Sato |
| 2002/0069370 A1 | 6/2002 | Mack |
| 2002/0082967 A1 | 6/2002 | Kaminsky et al. |
| 2002/0095512 A1 | 7/2002 | Rana et al. |
| 2002/0105911 A1 | 8/2002 | Pruthi et al. |
| 2002/0116508 A1 | 8/2002 | Khan et al. |
| 2002/0129140 A1 | 9/2002 | Peled et al. |
| 2002/0138376 A1 | 9/2002 | Hinkle |
| 2002/0162025 A1 | 10/2002 | Sutton et al. |
| 2002/0166063 A1 | 11/2002 | Lachman, III et al. |
| 2003/0009693 A1 | 1/2003 | Brock et al. |
| 2003/0014662 A1 | 1/2003 | Gupta et al. |
| 2003/0018630 A1 | 1/2003 | Indeck et al. |
| 2003/0023876 A1 | 1/2003 | Bardsley et al. |
| 2003/0033240 A1 | 2/2003 | Balson et al. |
| 2003/0037037 A1 | 2/2003 | Adams et al. |
| 2003/0043805 A1 | 3/2003 | Graham et al. |
| 2003/0051043 A1 | 3/2003 | Wyschogrod et al. |
| 2003/0055658 A1 | 3/2003 | RuDusky |
| 2003/0055770 A1 | 3/2003 | RuDusky |
| 2003/0055771 A1 | 3/2003 | RuDusky |
| 2003/0055777 A1 | 3/2003 | Ginsberg |
| 2003/0065607 A1 | 4/2003 | Satchwell |
| 2003/0065943 A1 | 4/2003 | Geis et al. |
| 2003/0074582 A1 | 4/2003 | Patel et al. |
| 2003/0078865 A1 | 4/2003 | Lee et al. |
| 2003/0093347 A1 | 5/2003 | Gray |
| 2003/0110229 A1 | 6/2003 | Kulig et al. |
| 2003/0126065 A1 | 7/2003 | Eng et al. |
| 2003/0149869 A1 | 8/2003 | Gleichauf |
| 2003/0177253 A1 | 9/2003 | Schuehler et al. |
| 2003/0198345 A1 | 10/2003 | Van Buer |
| 2003/0208430 A1 | 11/2003 | Gershon |
| 2003/0221013 A1 | 11/2003 | Lockwood et al. |
| 2004/0015633 A1 | 1/2004 | Smith |
| 2004/0028047 A1 | 2/2004 | Hou et al. |
| 2004/0034587 A1 | 2/2004 | Amberson et al. |
| 2004/0049596 A1 | 3/2004 | Schuehler et al. |
| 2004/0100977 A1 | 5/2004 | Suzuki et al. |
| 2004/0105458 A1 | 6/2004 | Ishizuka |
| 2004/0107361 A1* | 6/2004 | Redan et al. ............ 713/201 |
| 2004/0133634 A1* | 7/2004 | Luke et al. ............ 709/203 |
| 2004/0177340 A1 | 9/2004 | Hsu et al. |
| 2004/0186804 A1 | 9/2004 | Chakraborty et al. |
| 2004/0186814 A1 | 9/2004 | Chalermkraivuth et al. |
| 2004/0199448 A1 | 10/2004 | Chalermkraivuth et al. |
| 2004/0205149 A1 | 10/2004 | Dillon et al. |
| 2005/0033672 A1 | 2/2005 | Lasry et al. |
| 2005/0086520 A1 | 4/2005 | Dharmapurikar et al. |
| 2005/0091142 A1 | 4/2005 | Renton et al. |
| 2005/0097027 A1 | 5/2005 | Kavanagh |
| 2005/0131790 A1 | 6/2005 | Benzschawel et al. |
| 2005/0187844 A1 | 8/2005 | Chalermkraivuth et al. |
| 2005/0187845 A1 | 8/2005 | Eklund et al. |
| 2005/0187846 A1 | 8/2005 | Subbu et al. |
| 2005/0187847 A1 | 8/2005 | Bonissone et al. |
| 2005/0187848 A1 | 8/2005 | Bonissone et al. |
| 2005/0187849 A1 | 8/2005 | Bollapragada et al. |
| 2005/0195832 A1 | 9/2005 | Dharmapurikar et al. |
| 2005/0197938 A1 | 9/2005 | Davie et al. |
| 2005/0197939 A1 | 9/2005 | Davie et al. |
| 2005/0197948 A1 | 9/2005 | Davie et al. |
| 2005/0216384 A1 | 9/2005 | Partlow et al. |
| 2005/0267836 A1 | 9/2005 | Crosthwaite et al. |
| 2005/0283423 A1 | 9/2005 | Moser et al. |
| 2005/0232180 A1* | 10/2005 | Toporek et al. ............ 370/316 |
| 2006/0020536 A1 | 1/2006 | Renton et al. |
| 2006/0031154 A1 | 2/2006 | Noviello et al. |
| 2006/0031156 A1 | 2/2006 | Noviello et al. |
| 2006/0059064 A1 | 3/2006 | Glinberg et al. |
| 2006/0059065 A1 | 3/2006 | Glinberg et al. |
| 2006/0059066 A1 | 3/2006 | Glinberg et al. |
| 2006/0059067 A1 | 3/2006 | Glinberg et al. |
| 2006/0059068 A1 | 3/2006 | Glinberg et al. |
| 2006/0059069 A1 | 3/2006 | Glinberg et al. |
| 2006/0059083 A1 | 3/2006 | Friesen et al. |
| 2006/0059099 A1 | 3/2006 | Ronning et al. |
| 2006/0075119 A1* | 4/2006 | Hussain et al. ............ 709/227 |
| 2006/0092943 A1* | 5/2006 | Sundaram et al. ............ 370/394 |
| 2006/0164978 A1* | 7/2006 | Werner et al. ............ 370/229 |
| 2006/0259417 A1 | 11/2006 | Marynowski et al. |
| 2006/0294059 A1 | 12/2006 | Chamberlain et al. |
| 2007/0067108 A1 | 3/2007 | Buhler et al. |
| 2007/0078837 A1 | 4/2007 | Indeck et al. |
| 2007/0118500 A1 | 5/2007 | Indeck et al. |
| 2007/0130140 A1 | 6/2007 | Cytron et al. |
| 2007/0174841 A1 | 7/2007 | Chamberlain et al. |
| 2007/0180533 A1* | 8/2007 | Ramaiah et al. ............ 726/26 |
| 2007/0277036 A1* | 11/2007 | Chamberlain et al. |
| 2008/0037420 A1* | 2/2008 | Tang ............ 370/229 |
| 2008/0109413 A1 | 5/2008 | Indeck et al. |
| 2008/0114760 A1 | 5/2008 | Indeck et al. |
| 2008/0126320 A1 | 5/2008 | Indeck et al. |
| 2008/0133453 A1 | 6/2008 | Indeck et al. |
| 2008/0133519 A1 | 6/2008 | Indeck et al. |
| 2009/0019538 A1* | 1/2009 | Pandya ............ 726/13 |

FOREIGN PATENT DOCUMENTS

| | | |
|---|---|---|
| EP | 0887723 | 12/1998 |
| EP | 0911738 A2 | 4/1999 |
| EP | 0 573 991 B1 | 1/2002 |
| EP | 0851358 | 3/2003 |
| JP | 9-269930 | 10/1997 |
| JP | 10-313341 | 11/1998 |
| JP | 2000-357176 | 12/2000 |
| JP | 2001-014239 | 1/2001 |
| JP | 2001-217834 | 10/2001 |
| JP | 2001-518724 | 10/2001 |
| WO | WO 90/10910 | 9/1990 |
| WO | WO 97/37735 | 10/1997 |
| WO | WO 99/05814 | 2/1999 |

| | | |
|---|---|---|
| WO | WO 99/55052 | 10/1999 |
| WO | WO 01/22425 A1 | 3/2001 |
| WO | WO 01/39577 | 6/2001 |
| WO | WO 01/61913 A2 | 8/2001 |
| WO | WO 01/80082 A2 | 10/2001 |
| WO | WO01/80558 A2 | 10/2001 |
| WO | WO02/061525 A2 | 8/2002 |
| WO | WO 02/082271 A1 | 10/2002 |
| WO | WO 03/036845 A2 | 5/2003 |
| WO | WO 03/100650 A1 | 12/2003 |
| WO | WO 03/100662 A2 | 12/2003 |
| WO | WO2004/017604 A2 | 2/2004 |
| WO | WO 2004/042560 A2 | 5/2004 |
| WO | WO 2004/042561 A2 | 5/2004 |
| WO | WO 2004/042562 A2 | 5/2004 |
| WO | WO 2004/042574 A2 | 5/2004 |
| WO | WO 2005/017708 A2 | 2/2005 |
| WO | WO 2005/026925 A2 | 3/2005 |
| WO | WO 2005/048134 A2 | 5/2005 |
| WO | WO 2006/096324 A2 | 9/2006 |
| WO | WO 2008/022036 A2 | 2/2008 |

OTHER PUBLICATIONS

Baboescu, et al., "Scalable Packet Classification".
Braun, et al., "Layered Protocol Wrappers for Internet Packet Processing in Reconfigurable Hardware", Applied Research Laboratory, Washington University in St. Louis.
Feldmann, "BLT: Bi-Layer Tracing of HTTP and TCP/IP", AT&T Labs-Research, Florham Park, NJ, USA.
Gupta, et al., "Packet Classification on Multiple Fields", Computer Systems Laboratory, Stanford University, Stanford, CA.
Gurtov, "Effect of Delays on TCP Performance", Cellular Systems Development, Sonera Corporation.
"RFC793: Transmission Control Protocol, Darpa Internet Program, Protocol Specification", Sep. 1981.
Jacobson, et al., "RFC 1072: TCP Extensions for Long-Delay Paths", Oct. 1988.
Johnson, et al., "Pattern Matching in Reconfigurable Logic for Packet Classification", College of Computing, Georgia Institute of Technology, Atlanta, GA.
John W. Lockwood, "An Open Platform for Development of Network Processing Modules in Reprogrammable Hardware", Department of Computer Science, Applied Research Lab, Washington University.
Mao, et al., "Cluster-based Online Monitoring System of Web Traffic", Dept. of Computer Science and Technology, Tsinghua Univ., Bejing, 100084 P.R. China.
Jacobson, et al., "tcpdump—dump traffic on a network".
Necker, et al., "TCP-Stream Reassembly and State Tracking in Hardware", School of Electrical and Computer Engineering, Georgia Institute of Technology, Atlanta, GA.
Prakash, et al., "OC-3072 Packet Classification Using BDDs and Pipelined SRAMs", Department of Electrical and Computer Engineering, The University of Texas at Austin.
Roberts, "Internet Still Growing Dramatically Says Internet Founder", Press Release, Caspian Networks, Inc.—Virtual Pressroom.
Wooster, et al., "HTTPDUMP Network HTTP Packet Snooper", Apr. 25, 1996.
Shalunov, et al., "Bulk TCP Use and Performance on Internet 2".
Chaney, et al., "Design of a Gigabit ATM Switch", Washington University, St. Louis.
Waldvogel, et al., "Scalable High-Speed Prefix Matching".
Agere Systems, "Lucent Delivers 'Payload Plus' Network Processors for Programmable, Multiprotocol, OC-48c Processing", Agere Systems Press Release, Oct. 30, 2000, Allentown, PA.
Agere Systems, "Payload Plus™ Agere System Interface", Agere Systems Product Brief, Jun. 2001, downloaded from Internet, Jan. 2002, Allentown, PA.
Artan, N. Sertec et al., "Multi-packet Signature Detection using Prefix Bloom Filters", IEEE Globecom 2005, pp. 1811-1816.

Baeza-Yates and Navarro, "New and Faster Filters for Multiple Approximate String Matching", Random Structures and Algorithms (RSA), vol. 20, No. I , Jan. 2002, pp. 23-49.
Berk, Elliot, "JLex: A lexical analyzer generator for Java™", Sep. 6, 2000, downloaded from http:—www.cs.princeton.edu-~appel-modem-java-Jlex- in Jan. 2002.
Bloom, Burton H., "Space-Time Trade-offs in Hash Coding With Allowable Errors", Communications of the ACM, 13(7): 422-426, Computer Usage Company, Newton Upper Falls, Massachusetts, USA, Jul. 1970.
Choi, Sumi et al., "Design of a Flexible Open Platform for High Performance Active Networks", Allerton Conference, Champaign, IL, 1999.
Cloutier, Jocelyn et al., "VIP: An FPGA-Based Processor for Image Processing and Neural Networks", Proceedings of Fifth International Conference on Microelectronics for Neural Networks, Feb. 12, 1996, pp. 330-336, Los Alamitos, California.
Compton, Katherine et al., "Reconfigurable Computing: A Survey of Systems and Software", Technical Report, Northwestern University, IL, 16, Dept. of ECE, 1999.
Cuppu, Vinodh and Jacob, Bruce, "Organizational Design Trade-offs at the DRAM, Memory Bus, and Memory Controller Level: Initial Results;" Technical Report UMB-SCA-TR-1999-2, Univ. of Maryland Systems & Computer Architecture Group, pp. 1-10, Nov. 1999, College Park, MD.
Dharmapurikar, Sarang et al., "Longest Prefix Matching Using Bloom Filters," SIGCOMM 2003, pp. 201-212, Karlsruhe, Germany, Aug. 25-29, 2003.
Dharmapurikar, Sarang et al., "Robust TCP Stream Reassembly In the Presence of Adversaries", Proceedings of the 14th Conference on USENIX Security Symposium—vol. 14, 16 pages, Baltimore, MD, 2005. http:—www.icir.org-vern-papers-TcpReassembly-TcpReassembly.pdf.
Franklin, R. et al., "Assisting Network Intrusion Detection with Reconfigurable Hardware", Symposium on Field-Programmable Custom Computing Machines (FCCM 2002), Apr. 2002, Napa, California.
Fu, Henry et al., "The FPX KCPSM Module: An Embedded, Reconfigurable Active Processing Module for the Field Programmable Port Extender (FPX)", Washington University, Department of Computer Science, Technical Report WUCS-01-74, Jul. 26, 2001, St. Louis, MO.
Hauck, Scott and Agarwal, Anant, "Software Technologies for Reconfigurable Systems", Northwestern University, IL, Dept. Of ECE, Technical Report, pp. 1-40, 1996.
Hollaar, Lee A., "Hardware Systems for Text Information Retrieval", Proceedings of the Sixth Annual International ACM Sigir Conference on Research and Development in Information Retrieval, Jun. 6-8, 1983, pp. 3-9, Baltimore, Maryland, USA.
Keutzer, Kurt & Shah, Niraj, "A Survey of Programmable Platforms—Network Proc", University of California-Berkeley, CA, Sep. 2001, Berkeley, CA.
Lockwood, John & Lim, David, "Hello, World: A Simple Application for the Field-programmable Port Extender (FPX)", Washington University, Department of Computer Science, Technical Report WUCS-TM-00-12, Jul. 11, 2000, St. Louis, MO.
Lockwood, John W., "Simulation of the Hello World Application for the Field-programmable Port Extender (FPX)", Washington University, Applied Research Lab, Spring 2001 Gigabits Kits Workshop, St. Louis, MO.
Lockwood, John, "Field-programmable Port Extender (FPX)", Jan. 2002 Workshop, Washington University, St. Louis, MO, Jan. 3-4, 2002. (slides and handouts from workshop).
Lockwood, John W. et al., "Field Programmable Port Extender (FPX) for Distributed Routing and Queuing", ACM International Symposium on Field Programmable Gate Arrays (FPGA '2000), Monterey, CA, Feb. 2000, pp. 137-144.
Lockwood, John et al., "Parallel FPGA Programming over Backplane Chassis", Washington University, Department of Computer Science, Technical Report WUCS-OO-I I, Jun. 12, 2000, St. Louis, MO.
Lockwood, John W. et al., "Reprogrammable Network Packet Processing on the Field Programmable Port Extender (FPX)", ACM International Symposium on Field Programmable Gate Arrays (FPGA 2001), Monterey, CA, Feb. 11-13, 2001, pp. 87-93.

Lockwood, John W., "Evolvable Internet Hardware Platforms", NASA DoD Workshop on Evolvable Hardware (EHWOI), Long Beach, CA, Jul. 12-14, 2001, pp. 271-279.

Lockwood, John W., "Platform and Methodology for Teaching Design of Hardware Modules in Internet Routers and Firewalls", IEEE Computer Society International Conference on Microelectronic Systems Education (MSE 2OOI), Las Vegas, NV, Jun. 17-18, 2001, pp. 56-57.

Lucent, "Lucent Technologies delivers PayloadPlus network processors for programmable, multi-protocol, OC-48c processing", Lucent Technologies Press Release, downloaded from http:- lwww.lucent.com-press-1000-0010320.meb.html on Mar. 21, 2002.

Moscola, James M. et al., "FPGrep and FPSed: Regular Expression Search and Substitution for Packet Streaming in Field Programmable Hardware", Dept. of Computer Science, Applied Research Lab, Washington University, St. Louis, MO, Jan. 8, 2002.

Moscola, James, "FPgrep and FPsed: Packet Payload Processors for Managing the Flow of Digital Content on Local Area Networks and the Internet", Masters Thesis, Sever Institute of Technology, Washington University, St. Louis, Missouri, Aug. 2003.

Moscola, James et al. "FPsed: A Streaming Content Search-and-Replace Module for an Internet Firewall", Proceedings of Hot Interconnects, 11th Symposium on High Performance Interconnects, pp. 122-129, Aug. 20, 2003.

Navarro, Gonzalo, "A Guided Tour to Approximate String Matching", ACM Computing Surveys, vol. 33, No. 1, Mar. 2001, pp. 31-88, and online at http:—security.riit.tsinghua.edu.cn-seminar-2006_3_9-2001-A_Guided_Tour_to_Approximate_String_Matching.pdf.

Pramanik, Sakti et al., "A Hardware Pattern Matching Algorithm on a Dataflow", The Computer Journal, Jul. 1, 1985, pp. 264-269, vol. 28, No. 3, Oxford University Press, London, Great Britain.

Schuehler, David V. et al., "Architecture for a Hardware Based, TCP-IP Content Scanning System", IEEE Micro, 24(1):62-69, Jan.-Feb. 2004, U.S.A.

Schuehler, David V. et al., "TCP-Splitter: A TCP-IP Flow Monitor in Reconfigurable Hardware", Hot Interconnects 10 (HotI-10), Stanford, CA, Aug. 21-23, 2002, pp. 127-131.

Shah, Niraj, "Understanding Network Processors", Version 1 .O, University of California-Berkeley, Sep. 4, 2001, Berkeley, CA.

Sidhu, Reetinder et al., "Fast Regular Expression Matching using FPGAs", IEEE Symposium on Field Programmable Custom Computing Machines (FCCM 2001), Apr. 2001.

Sidhu, Reetinder et al., "String Matching on Multicontext FPGAs using Self-Reconfiguration", FPGA '99: Proceedings of the 1999 ACMISIGDA 7th International Symposium on Field Programmable Gate Arrays, Feb. 1999, pp. 217-226, Monterey, CA.

Taylor, David E. et al., "Dynamic Hardware Plugins (DHP): Exploiting Reconfiguarable Hardware for High-Performance Programmable Routers", Computer Networks, 38(3): 295-310(16), Feb. 21, 2002, and online at http:—www.cc.gatech.edu-classes-AY2007-cs8803hpc_fall-papers-dhplugins.pdf.

Taylor, David E. et al., "Generalized RAD Module Interface Specification of the Field Programmable Port Extender (FPX) Version 2.0", Washington University, Department of Computer Science, Technical Report, WUCS-TM-01-15, Jul. 5, 2001, St. Louis, MO.

Yamaguchi et al., High Speed Homology Search with FPGAs, Proceedings of the Pacific Symposium on Biocomputing, Lihue, Hawaii, 7:271-282, Jan. 3, 2002, and online at: http:—psb.stanford.edu-psb-online-proceedings-psb02-yamaguchi.pdf.

Yan, Jeff et al., "Enhancing Collaborative Spam Detection with Bloom Filters", Proceedings of the 22nd Annual Computer Security Applications Conference (ACSAC '06), IEEE, pp. 414-425, 2006.

Anonymous, "Method for Allocating Computer Disk Space to a File of Known Size", IBM Technical Disclosure Bulletin, vol. 27, No. 10B; New York, NY, Mar. 1, 1985.

Arnold, Jeffrey et al., "The Splash 2 Processor and Applications", Proceedings of the 1993 IEEE International Conference on Computer Design: VLSI in Computers and Processors, Oct. 3, 1993, pp. 482-485, Cambridge, Massachusetts.

Baer, Jean-Loup, Computer Systems Architecture, pp. 262-265, Computer Science Press, Rockville, MD, 1980.

Barone-Adesi, G. & Whaley, R., "Efficient Analytic Approximation of American Option Values", Journal of Finance, 42(2): 301-320, Jun. 1987, U.S.A.

Behrens, Chris et al., "BLASTN Redundancy Filter in Reprogrammable Hardware," Final Project Submission, Fall 2003, Department of Computer Science and Engineering, Washington University, St. Louis, MO.

Bonomi, Flavio et al., "Beyond Bloom Filters: From Approximate Membership Checks to Approximate State Machines", presented at SIGCOMM '06, Sep. 11-15, 2006, Pisa, Italy; ACM SIGCOMM Computer Communication Review, 36(4): 315-326 (Oct. 2006) ISSN:0146-4833 or online at http://research.microsoft.com/users/rina/papers/sigcomm2006.pdf.

Chamberlain, Roger et al., "Achieving Real Data Throughput for an FPGA Co-Processor on Commodity Server Platforms", Proceedings of the 1st Workshop on Building Block Engine Architectures for Computers and Networks, Oct. 2004, Boston, MA.

Chaney, Tom et al., "Design of a Gigabit ATM Switch", Proceedings IEEE, 1:2-11, INFOCOM '97, Sixteenth Annual Joint Conference of the IEEE Computer and Communications Societies, Apr. 7-11, 1997, Kobe, Japan.

Choi, Sumi et al., "Design of a Flexible Open Platform for High Performance Active Networks", (Presentation Slides), Allerton Conference, Champaign, IL, 1999.

Cong, Jason & Ding, Yuzheng, "An Optimal Technology Mapping Algorithm for Delay Optimization in Lookup-Table Based FPGA Designs", IEEE/ACM International Conference on Computer-Aided Design, Santa Clara, CA, Digest of Technical Papers, pp. 48-53, Nov. 8, 1992.

Dharmapurikar, Sarang et al., "Deep Packet Inspection using Parallel Bloom Filters," Symposium on High Performance Interconnects (HotI), Stanford, California, 2003, pp. 1-8.

Donnet, Benoit et al., "Retouched Bloom Filters: Allowing Networked Applications to Trade Off Selected False Positives Against False Negatives", International Conference On Emerging Networking Experiments And Technologies, Proceedings of the 2006 ACM CoNEXT Conference, Lisbon, Portugal, Dec. 4-7, 2006, Article No. 13, ISBN:1-59593-456-1 and online at http://arxiv.org/PS_cache/cs/pdf/0607/0607038v2.pdf.

Ebeling, Carl et al., "RaPiD—Reconfigurable Pipelined Datapath", FPL '96: The 6$^{th}$ International Workshop on Field-Programmable Logic and Applications, Springer-Verlag, pp. 126-135, 2006; paper initially presented Sep. 23, 1996, Seattle, WA.

Feldmann, Anja, "BLT: Bi-Layer Tracing of HTTP and TCP/IP", Computer Networks 33(1):321-335, Jun. 2000; an earlier version of the paper was posted Nov. 1998.

Franklin, Mark et al., "An Architecture for Fast Processing of Large Unstructured Data Sets", Proceedings of the 22nd International Conference on Computer Design, pp. 280, 287, Washington, D.C., Oct. 11-13, 2004.

Gavrila, D.M., "Multi-feature Hierarchical Template Matching Using Distance Transforms", Proceedings of the 14th International Conference on Pattern Recognition, 1:439-444, Brisbane, Qld., AU, Aug. 16-20, 1998.

Gunther, Bernhard et al., "Assessing Document Relevance with Run-Time Reconfigurable Machines", IEEE, pp. 10-17, Proceedings, IEEE Symposium on FPGAs for Custom Computing Machines, Napa Valley, CA, Apr. 17, 1996.

Gyang, Kwame, "NCBI BLASTN Stage 1 in Reconfigurable Hardware", Technical Report WUCSE-2005-30, Aug. 31, 2004, Department of Computer Science and Engineering, Washington University, St. Louis, MO.

Hao, Fang et al., "Building High Accuracy Bloom Filters using Partitioned Hashing", ACM SIGMETRICS Performance Evaluation Review, 35(1): 277-287, Jun. 2007.

Hayes, John P., Computer Architecture and Organization, Second Edition, 1988, pp. 448-459, McGraw-Hill, Inc., New York, NY, 1988.

Hezel, S. et al., FPGA-Based Template Matching using Distance Transforms, Proceedings of the 10th Annual IEEE Symposium on Field-Programmable Custom Computing Machines, Apr. 22, 2002, pp. 89-97, USA.

Johnson, Adam et al., "Pattern Matching in Reconfigurable Logic for Packet Classification", *International Conference on Compilers, Architecture, and Synthesis for Embedded Systems* (CASES), pp. 126-130, Nov. 16-17, 2001, Atlanta, Georgia, USA.

Kaya, Ilhan & Kocak, Taskin, "Increasing the Power Efficiency of Bloom Filters for Network String Matching", *IEEE International Symposium on Circuits and Systems (ISCAS)*, pp. 1828-1831, May 21-24, 2006, ISBN: 0-7803-9389-9.

Kefu, Xu et al., "Fast Dynamic Pattern Matching for Deep Packet Inspection", *IEEE International Conference on Networking, Sensing and Control* (Sanya, China), pp. 802-807, Apr. 6-8, 2008, manuscript received Sep. 20, 2007.

Krishnamurthy, Praveen et al., "Bioscience Similarity Search on the Mercury System", *IEEE, Proceedings of the 15th International Conference on Application-specific Systems, Architectures and Processors*, pp. 365-375, Galveston Island, Texas, Sep. 27-29, 2004.

Lancaster, Joseph et al., "Acceleration of Ungapped Extension in Mercury BLAST", Proceedings of the 7th Workshop on Media and Streaming Processors, 38th International Symposium on Microarchitecture, Barcelona, Spain, Nov. 12, 2005.

Lin, Ting-Pang et al., "Real-Time Image Template Matching Based on Systolic Amy Processor", *International Journal of Electronics*, Dec. 1, 1992, pp. 1165-1176, vol. 73, No. 6, London, Great Britain, paper received Feb. 8, 1992.

Madhusudan, Bharath, "Design of a System for Real-time Worm Detection", *Hot Interconnects*, pp. 77-83, Stanford, CA, Aug. 2004, found at http://www.hoti.org/hoti12/program/papers/2004/paper4.2.pdf.

Madhusudan, Bharath, "Design of a System for Real Time Worm Detection", Master's Thesis, Washington University, Dept. of Computer Science and Engineering, Saint Louis, MO, Aug. 2004.

Madhusudan, Bharath, "Design of a System for Real-time Worm Detection", Power Point presentation in support of Master's Thesis, Washington University, Dept. of Computer Science and Engineering, Saint Louis, MO, Aug. 2004.

Mao, Yun et al., "Cluster-based Online Monitoring System of Web Traffic", *Proceedings of the Third International Workshop on Web Information and Data Management (WIDM'2001)*, pp. 47-53, Atlanta, Georgia, Nov. 9, 2001.

Mosanya, Emeka et al., "A FPGA-Based Hardware Implementation of Generalized Profile Search Using Online Arithmetic", ACMISIGDA *International Symposium on Field Programmable Gate Arrays*, Feb. 21, 1999, pp. 101-111, Monterey, California.

Nunez, Jose Louis et al., "The X-MatchLITE FPGA-Based Data Compressor", *Euromicro Conference 1999 Proceedings*, Italy, Sep. 8-10, 1999.

Patent Cooperation Treaty, International Search Report for PCT/US01/11255, mailed Jul. 10, 2003.

Patent Cooperation Treaty, International Search Report for PCT/US03/15910, mailed Oct. 23, 2003.

Patent Cooperation Treaty, International Search Report for PCT/US02/33286, mailed Jan. 22, 2003.

Patent Cooperation Treaty, Annex to Form PCT/ISA/206 for PCT/US03/15638, mailed Feb. 3, 2004.

Patent Cooperation Treaty, International Search Report for PCT/US03/15638, mailed May 6, 2004.

Patent Cooperation Treaty, International Search Report for PCT/US2004/016398, mailed Apr. 12, 2005.

Patent Cooperation Treaty, International Search Report for PCT/US2004/016021, mailed Aug. 18, 2005.

Patent Cooperation Treaty, International Search Report for PCT/US05/30046, mailed Sep. 25, 2006.

Patent Cooperation Treaty, International Search Report for PCT/US2006/006105, mailed Feb. 5, 2007.

Patent Cooperation Treaty, International Search Report for PCT/US2007/060835, mailed Jul. 13, 2007.

PICMG, "AdvancedMC™ PICMG® AMC.0 R2.0 Short Form Specification", Dec. 28, 2006, Wakefield, MA, online at: http://www.picmg.org/pdf/AMC.0_R2.0_Short_Form.pdf.

PICMG, "MicroTCA™ PICMG® MTCA.0 R1.0 Micro Telecommunications Computing Architecture Short Form Specification", Sep. 21, 2006, Wakefield, MA, online at: http://www.picmg.org/pdf/MicroTCA_Short_Form_Sept_2006.pdf.

PICMG, "PICMG Open Modular Computing Specifications", Jun. 16, 2008, Wakefield, MA, Web page found at: http://www.picmg.org/v2internal/specifications.htm.

PMPublishing, "WebPOP: The Professional Options Package—Risk Management for Options Traders", Web pages retrieved on Feb. 13, 2006, from www.pmpublishing.com.

Ramakrishna, M.V. et al., "A Performance Study of Hashing Functions for Hardware Applications", *Journal of Computing and Information*, vol. 1, No. 1, May 1994, pp. 1621-1636.

Ramakrishna, M.V. et al., "Efficient Hardware Hashing Functions for High Performance Computers", IEEE Transactions on Computers 46(12):1378-1381, Dec. 1997.

Ratha, Nalini K., et al., "Convolution on Splash 2", *Proceedings of IEEE Symposium on FPGAs for Custom Computing Machines*, pp. 204-213, Los Alamitos, California, Apr. 19, 1995.

Rehman, Rafeeq Ur, "HP-Certified HP-UX System Administration", Prentice Hall PTR, Indianapolis, IN, May 31, 2000, from: http://proquest.safaribooksonline.com/0130183741.

Roberts, Lawrence, "Internet Still Growing Dramatically Says Internet Founder", *Press Release, Caspian Networks, Inc.*—Virtual Pressroom, PR Newswire, New York, NY, Aug. 15, 2001.

Schmit, Herman, "Incremental Reconfiguration for Pipelined Applications", IEEE, 47-55, *Proceedings of the 5th Annual IEEE Symposium on FPGAs for Custom Computing Machines*, Apr. 1997.

Shalunov, Stanislav and Teitelbaum, Benjamin, "TCP Use and Performance on Internet2", *ACM SIGCOMM Internet Measurement Workshop 2001*, San Francisco, CA Nov. 1-2, 2001.

Shirazi, N. et al., "Quantitative Analysis of FPGA-Based Database Searching", *Journal of VLSI Signal Processing*, May 2001, pp. 85-96, vol. 28, No. 112, Dordrecht, Netherlands.

Singh, Sumeet et al., "The EarlyBird System for Real-time Detection of Unknown Worms", *Technical Report CS2003-0761*, Aug. 2003.

Taylor and Turner, "Scalable Packet Classification using Distributed Crossproducting of Field Labels", *Proceedings of IEEE Infocom*, vol. 20, No. 1, Mar. 2005, pp. 269-280.

Taylor, David and Lockwood, John., "Modular Design Techniques for the FPX", Field Programmable Port Extender: *Jan. 2002 Gigabit Workshop Tutorial*, Washington University, St. Louis, MO, Jan. 3-4, 2002.

Taylor, David, "Models, Algorithms, and Architectures for Scalable Packet Classification", doctoral thesis, Department of Computer Science and Engineering, Washington University, St. Louis, MO, Aug. 2004.

Villasenor, John et al., "Configurable Computing Solutions for Automatic Target Recognition", *Proceedings of IEEE Symposium on FPGAs for Custom Computing Machines*, Apr. 17, 1996, pp. 70-79, Los Alamitos, California.

Waldvogel, Marcel et al., "Scalable High-Speed Prefix Matching", *ACM Transactions on Computer Systems*, 19(4):440-482, Nov. 2001.

Ward, Brent D. & Snavely, Allan E., "Dynamically Reconfigurable Computing: A Novel Computation Technology with Potential to Improve National Security Capabilities by Dramatically Improving High-End Computing", White Paper prepared by Star Bridge Systems, Inc., May 15, 2003, found at: http:/www.starbridgesystems/resources/whitepapers/Dynamically%20/Reconfigurable%20Computing.pdf.

Weaver, N. et al., "Very Fast Containment of Scanning Worms", *Proceedings USENIX Security Symposium 2004*, San Diego, CA, Aug. 2004, located at http://www.icsi.berkeley.edu/~nweaver/containment/containment.pdf.

Wooster, et al., "HTTPDUMP Network HTTP Packet Snooper", Apr. 25, 1996, available at http://ei.cs.vt.edu/~succeed/96httpdump/html/paper.html.

Yardley, J. et al., "A Reconfigurable Computing Model for Biological Research Application of Smith-Waterman Analysis to Bacterial Genomes", A White Paper prepared by Star Bridge Systems, Inc., Copyright 2005, available at http:/www.starbridgesystems/resources/whitepapers/Smith%20/Waterman%20Whitepaper.pdf (Poster presentation with same title given by same authors at ERSA '04 on Jun. 21, 2004).

Bossardt, Matthias et al., "ABR Architecture and Simulation for an Input-Buffered and Per-VC Queued ATM Switch", *IEEE Global Telecommunications Conference (Globecom'98)*, pp. 1817-1822, Sydney, Australia, Nov. 1998.

Braun, Florian et al., "Layered Protocol Wrappers for Internet Packet Processing in Reconfigurable Hardware", Washington University, Department of Computer Science, Technical Report WUCS-01-10, Jul. 2001, *Proceedings of Hot Interconnects 9 (HotI-9)*, Stanford, CA, Aug. 22-24, 2001, pp. 93-98.

Braun, Florian et al., "Protocol Wrappers for Layered Network Packet Processing in Reconfigurable Hardware", *IEEE Micro*, vol. 22, No. 3, pp. 66-74, Feb. 2002.

Dharmapurikar, Sarang et al., "Synthesizable Design of a Multi-Module Memory Controller", Washington University, Dept. of Computer Science, *Technical Report WUCS-01-26*, Oct. 12, 2001.

Duan, Haoran et al., "A High-performance OC-12/OC-48 Queue Design Prototype for Input-buffered ATM Switches", *IEEE Infocom '97*, pp. 20-28, Kobe, Japan, Apr. 7-11, 1997.

Horta, Edson L. et al., "Dynamic Hardware Plugins in an FPGA with Partial Run-time Reconfiguration", Design Automation Conference (DAC), New Orleans, LA, Jun. 10-14, 2002.

Horta, Edson L. et al., Implementing a Dynamically Reconfigurable ATM Switch on the VIRTEX FPGA of the FPX Platform, *Proceedings of SPIE*, vol. 4867, Boston, MA, Jul. 30, 2002.

Horta, Edson L. et al., "PARBIT: A Tool to Transform Bitfiles to Implement Partial Reconfiguration of Field Programmable Gate Arrays (FPGAs)", Washington University, Department of Computer Science, Technical Report WUCS-01-13, Jul. 6, 2001.

Kuhns, Fred et al., "Design of a High Performance Dynamically Extensible Router", *DARPA Active Networks Conference and Exposition (DANCE)*, San Francisco, CA, May 2002.

Kuhns, Fred et al., "Implementation of an Open Multi-Service Router", Washington University, Department of Computer Science, Technical Report WUCS-01-20, Aug. 15, 2001.

Lockwood, John W. et al., "Field Programmable Port Extender (FPX) User Guide: Version 2.2", Washington University, Department of Computer Science and Engineering, *Technical Report WUCSE-02-15*, Jun. 18, 2002.

Lockwood, John William, "Design and Implementation of a Multicast, Input-Buffered ATM Switch for the iPOINT Testbed", PhD Dissertation, Department of Electrical and Computer Engineering, University of Illinois at Urbana-Champaign, UMI No. 9625160, 1995.

Lockwood, John W., Project History and Previous Research on the Illinois Input Queue and WUGS/iiQueue Integration, Aug. 1998.

Lockwood, John W., Quality of Service Enhancement of Washington University Gigabit Switch Using the Illinois Input Queue, Dec. 1996, Urbana and Champaign, IL.

Sproull, Todd et al., "Control and Configuration Software for a Reconfigurable Networking Hardware Platform", *IEEE Symposium on Field-Programmable Custom Computing Machines, (FCCM)*, Napa, CA, Apr. 24, 2002.

Taylor, David et al., "Scalable IP Lookup for Programmable Routers", *IEEE Infocom 2002*, New York NY, Jun. 23-27, 2002.

Taylor, David et al., "Scalable IP Lookup for Programmable Routers", Washington University, Department of Computer Science, *Technical Report WUCS-01-33*, Oct. 1, 2001.

Altschul, Stephen F., "Basic Local Alignment Search Tool", *Journal of Molecular Biology*, 215(3):403-410, Oct. 5, 1990.

Cavnar, William B. et al., "N-Gram-Based Text Categorization", *Proceedings of SDAIR-94, 3rd Annual Symposium on Document Analysis and Information Retrieval*, Las Vegas, pp. 161-175, 1994.

Forgy, Charles L., "Rete: A Fast Algorithm for the Many Pattern/Many Object Pattern Match Problem", *Artificial Intelligence*, 19:17-37, 1982, Noth Holland; received May 1980, revised version received Apr. 1981.

Hoinville, Jay R. et al., "Spatial Noise Phenomena of Longitudinal Magnetic Recording Media", *IEEE Transactions on Magnetics*, vol. 28, No. 6, Nov. 1992, New York, NY.

Jeanmougin, François et al., "Multiple sequence alignment with Clustal X", *Trends in Biochemical Sciences*, 23(10): 403-405, Oct. 1, 1998, Elsevier Science Ltd.

Jones, K. Sparck et al., "A probabilistic model of information retrieval: development and status", *Information Processing and Management*, 36(6):779-840, Cambridge, UK, Aug. 1998.

Jung, Bongjin et al., "Efficient VLSI for Lempel-Ziv Compression in Wireless Data Communication Networks", *IEEE Transactions on VLSI Systems*, 6(3):475-483, Sep. 1998, Institute of Electrical and Electronics Engineers, Washington, DC.

Pirsch, Peter, et al., "VLSI Architectures for Video Compression—A Survey", *Proceedings of the IEEE*, 83(2):220-246, Feb. 1995, Institute of Electrical and Electronics Engineers, Washington, DC.

Ranganathan, N. et al., "High-speed VLSI Designs for Lempel-Ziv-Based Data Compression", *IEEE Transactions on Circuits and Systems II: Analog and Digital Signal Processing*, 40(2):96-106, Feb. 1993, Institute of Electrical and Electronics Engineers, Washington, DC.

Ratha, Nalini K. et al., "FPGA-based coprocessor for text string extraction", *Proceedings. Fifth IEEE International Workshop on Computer Architectures for Machine Perception*, Padova, Italy, Sep. 11-13, 2000, pp. 217-221.

Roesch, Martin, "Snort—Lightweight Intrusion Detection for Networks", *Proceedings of LISA '99: 13th Systems Administration Conference*, pp. 229-238, Seattle, WA, Nov. 7-12, 1999.

Roy, Kaushik, "A Bounded Search Algorithm for Segmented Channel Routing for FPGA'S and Associated Channel Architecture Issues", *IEEE Transactions on Computer-Aided Design of Integrated Circuits and Systems*, 12(11):1695-1705, Nov. 1993.

Thompson, Julie D. et al., "The Clustal_X windows interface: flexible strategies for multiple sequence alignment aided by quality analysis tools", *Nucleic Acids Research*, 25(24):4876-4882, Dec. 15, 1997; received Sep. 24, 1997; revised and accepted Oct. 28, 1997.

"Field Programmable Port Extender"; Jan. 3-4, 2002; Gigabit Workshop Tutorial, Washington University, St. Louis, MO, pp. 1-4.

"The Field-Programmable Port Extender (FPX)"; downloaded from http://www.arl.wustl.edu/arl in Mar. 2002.

Cong, et al.; "An Optimal Technology Mapping Algorithm for Delay Optimization in Lookup-Table Based FPGA Designs"; 1992; IEEE, pp. 48-53.

"Announcing the Advanced Encryption Standard (AES)"; Nov. 26, 2001; U.S. Dept of Commerce/Nat'l Institute of Standards and Technology, Federal Information Processing Standards Publication 197, retrieved from website: http://csrc.nist.gov/publications/fips/fips197/fips-197.pdf.

"Data Encryption Standard (DES)"; Reaffirmed Oct. 25, 1999; U.S. Dept of Commerce/Nat'l Institute of Standards and Technology, Federal Information Processing Standards Publication FIPS Pub 46-3; retrieved from website: http://csrc.nist.gov/publications/fips/fips46-3/fips46-3.pdf.

Chodowiec, Pawel et al.; "Fast implementations of secret-key block ciphers using mixed inner and outer-round pipelining"; Feb. 11-13, 2001; ACM SIGDA International Symposium on Field Programmable Gate Arrays, FPGA '01, Monterey, CA.

Compton, Katherine et al.; "Configurable Computing: A Survey of Systems and Software"; 1999; Northwestern University, Dept. Of ECE, Technical Report, XP002315148, Evanston, Illinois.

Denoyer, Ludovic et al.; "HMM-based Passage Models for Document Classification and Ranking"; Mar. 16, 2001; 23rd BCS European Annual Colloquium on Information Retrieval, Darmstadt, Germany.

Franklin, R. et al.; "Assisting Network Intrusion Detection with Reconfigurable Hardware"; Preliminary Proceedings Apr. 2001 to appear in FCCM '02, Apr. 22-24, 2002; IEEE Symposium on Field-Programmable Custom Computing Machine, Napa, CA, USA.

Guerdoux-Jamet et al.; "Systolic Filter for Fast DNA Similarity Search"; Jul. 1995; IEEE International Conference on Application-Specific Array Processors, pp. 145-156, Strasbourg, France.

Hutchings, B.L. et al.; "Assisting Network Intrusion Detection with Reconfigurable Hardware"; 2002; Proceedings of the 10th Annual IEEE Symposium on Field-Programmable Custom Computing Machines (FCCM'02).

Steinbach, Michael et al.; "A Comparison of Document Clustering Techniques"; Aug. 2000; ACM SIGKDD International Conference on Discovery and Data Mining; Boston, MA, USA, pp. 1-20.

Ziv, Jacob et al.; "A Universal Algorithm for Sequential Data Compression"; May 1977; IEEE Transactions on Information Theory, vol. IT-23, No. 3, pp. 337-343.

Ziv, Jacob et al.; "Compression of Individual Sequences via Variable-Rate Coding"; Sep. 1978; IEEE Transactions on Information Theory, vol. IT-24, No. 5, pp. 530-536.

Patent Cooperation Treaty, International Search Report for PCT/US2008/065955, Mailed Aug. 22, 2008.

Patent Cooperation Treaty, International Search Report for PCT/US2008/066929, Mailed Aug. 29, 2008.

Patent Cooperation Treaty, International Search Report for PCT/US2007/075723, Mailed Jul. 25, 2008.

Patent Cooperation Treaty, International Search Report for PCT/US2007/067319, Mailed Jan. 11, 2008.

Patent Cooperation Treaty, International Preliminary Report on Patentability, for PCT/US03/25123, Mailed May 5, 2009.

Ansi X9.52-1998; "Triple Data Encryption Algorithm Modes of Operation"; approved: Jul. 29, 1998; American National Standards Institute.

Ramesh, et al.; "Automatic Selection of Tuning Parameters for Feature Extraction Sequences"; Jun. 21-23, 1994; IEEE; pp. 672-677; USA.

Niewczas, et al.; "A Pattern Matching Algorithm for Verification and Analysis of Very Large IC Layouts"; Apr. 6-8, 1998; ACM; pp. 129-143; Monterey, California.

Federal Information Processing Standard 46-2, "Data Encryption Standard", Dec. 30, 1993, National Bureau of Standards, pp. 1-15, U.S.A.

Mitzenmacher, Michael; "Compressed Bloom Filters"; published Oct. 2002 (manuscript received Aug. 1, 2001 and revised Dec. 5, 2001); IEEE/ACM Transactions on Networking, vol. 10, No. 5, pp. 604-612, U.S.A.

Fernandez, X.; "Template Matching of Binary Targets in Grey-Scale Images: A Nonparametric Approach"; *Pattern Recognition*, vol. 30, No. 7, pp. 1175-1182, 1997, Great Britain.

* cited by examiner

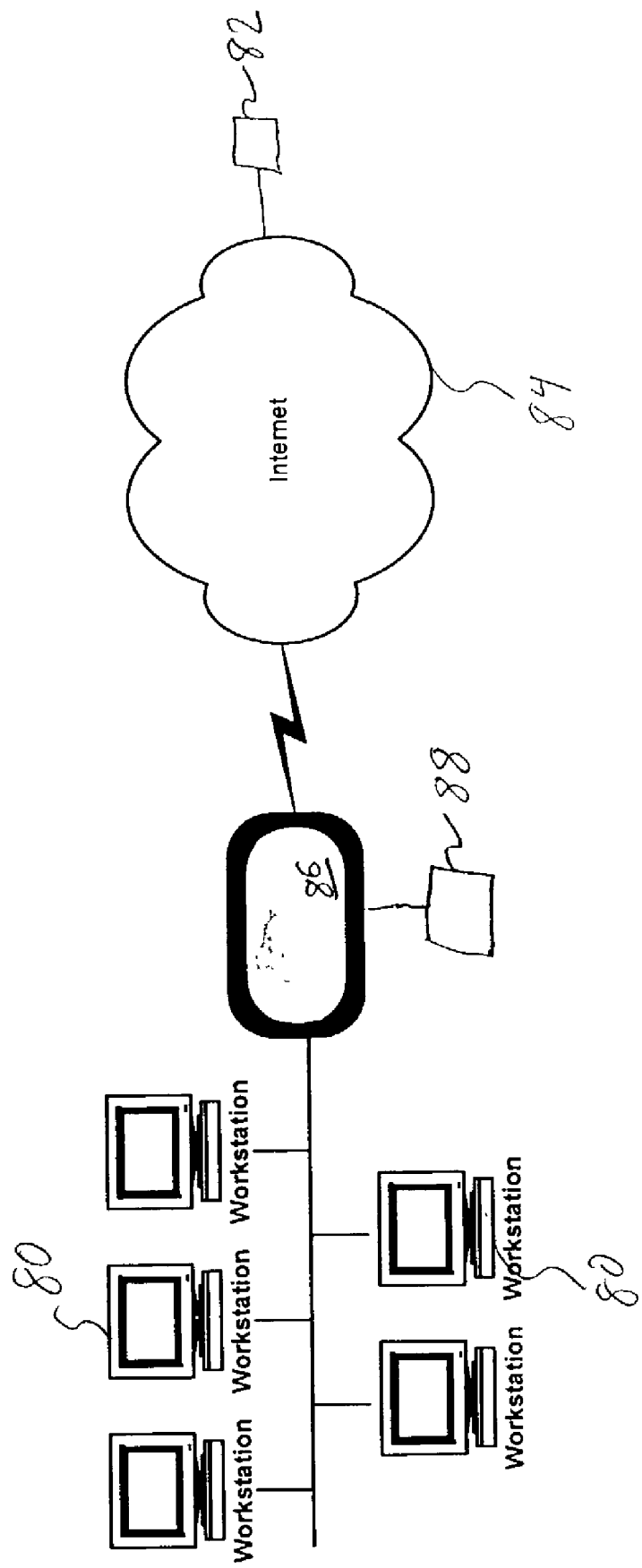

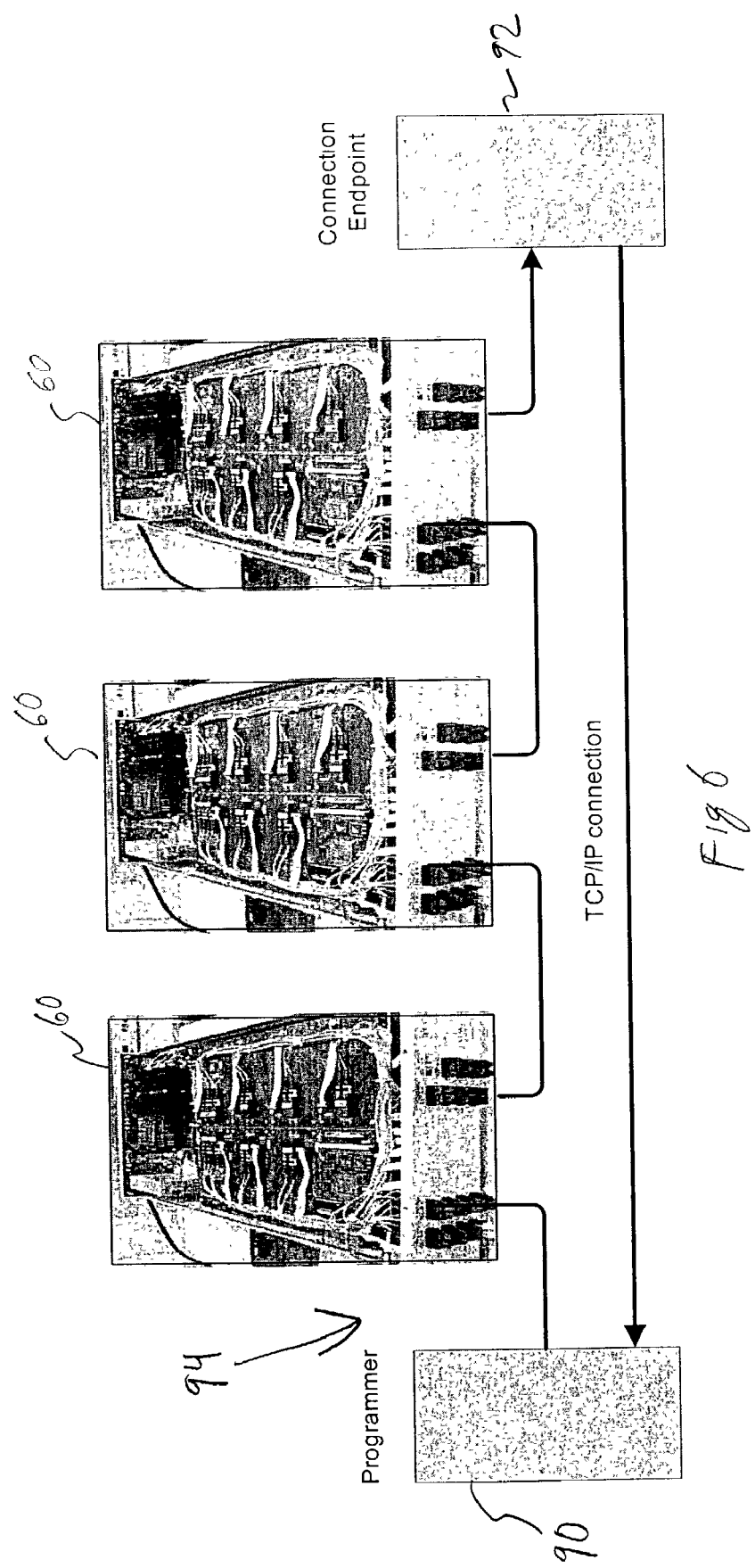

TCP-SPLITTER: RELIABLE PACKET MONITORING METHODS AND APPARATUS FOR HIGH SPEED NETWORKS

BACKGROUND OF THE INVENTION

This invention relates generally to data transfer through a network and, more particularly, to the monitoring of data passing through the Internet.

At least some known protocol analyzers and packet capturing programs have been around as long as there have been networks and protocols to monitor. These known tools provide the ability to capture and save network data with a wide range of capabilities.

For example, one such program "tcpdump" available from the Lawrence Berkeley National Laboratory (http://ee.lbl.gov/) allows for the capture and storage of TCP packets. These known tools work well for monitoring data at low bandwidth rates, but the performance of these programs is limited because they execute in software. Post processing is required with these tools in order to reconstruct TCP data streams.

Accordingly, it would be desirable to provide a solution to data monitoring that is implementable at high bandwidth rates.

BRIEF DESCRIPTION OF THE INVENTION

In one aspect, a method for obtaining data while facilitating keeping a minimum amount of state is provided. The method includes receiving at a first device an Internet Protocol (IP) frame sent from a second device to a third device wherein the first device is in a flow path between the second and third devices, the first device including at least one logic device. The method also includes removing an embedded stream-oriented protocol frame including a header and a data packet from the received IP frame with the logic device, and determining a validity of a checksum of the removed steam-oriented protocol header. The method also includes dropping the IP frame when the checksum is invalid, actively dropping IP frames such that the first device always has an accumulated in order content stream before the third device accumulates the in order stream, supplying a client application with data from the removed protocol frame when the checksum is valid, and sending an IP frame including the removed stream-oriented protocol frame to the third device from the first device when the checksum is valid.

In another aspect, an apparatus for facilitating keeping a minimum amount of state is provided. The apparatus includes at least one input port, at least one output port, and at least one logic device operationally coupled to the input port and the output port. The logic device is configured to receive an Internet Protocol (IP) frame sent from a first device addressed to a second device, remove an embedded stream-oriented protocol frame including a header and data packet from the received IP frame, classify the removed protocol frame as at least one of a sequence number greater than expected classification, a sequence number equal to expected, and a sequence number less than expected classification. The logic device is also configured to send an IP frame including the removed protocol frame to the second device when the classification is one of the sequence number less than expected classification and the sequence number equal to expected and drop the received IP frame including the removed protocol frame when the classification is the sequence number greater than expected classification. The logic device is also configured to actively drop IP frames such that the apparatus always has an accumulated in order content stream before the second device accumulates the in order stream.

In yet another aspect, an apparatus includes at least one input port, at least one output port, and at least one reprogrammable device. The apparatus also includes at least one logic device operationally coupled to the input port, the output port, and the reprogrammable device. The logic device is configured to receive an Internet Protocol (IP) frame sent from a first device addressed to a second device, remove an embedded stream-oriented protocol frame including a header and a data packet from the received IP frame, and determine if the removed protocol frame includes programming data. The logic device is also configured to reprogram the reprogrammable device when the removed protocol frame contains programming data, and send an IP frame including the removed protocol frame to the second device.

In still another aspect, an apparatus includes at least one input port, at least one output port, and at least one logic device operationally coupled to the input port and the output port. The logic device is configured to receive an Internet Protocol (IP) frame sent from a first device addressed to a second device, remove an embedded stream-oriented protocol frame including a header and a data packet from the received IP frame, and determine if the removed protocol frame includes data representing a quality of service (QoS) algorithm. The logic device is further configured to supply a client application with data from the removed protocol frame when the removed protocol includes QoS data, and send an IP frame including the removed protocol frame to the second device.

In yet still another aspect, a network including a plurality of switching devices operationally coupled to each other is provided. At least some of the switching devices including at least one logic device configured to monitor stream-oriented network traffic for Field Programmable Gate Array (FPGA) programming data, reprogram at least one of itself and a FPGA coupled to said logic device upon receipt of the FPGA programming data, and retransmit the FPGA programming data back onto the network such that other switching devices can reprogram themselves using the FPGA programming data.

In still yet another aspect, a method for distributing data is provided. The method including receiving at a first device an Internet Protocol (IP) frame sent from a second device to a third device wherein the first device is in a flow path between the second and third devices, wherein the first device includes an Integrated Circuit (IC). The method also includes removing an embedded protocol frame from the received IP frame with the IC, supplying a client application with data from the removed protocol frame, analyzing the data supplied to the client application, and sending an IP frame including the removed protocol frame to the third device from the first device only after analyzing the data.

In one aspect, a method for distributing data on a network using a single TCP/IP source, a single destination and one or more intermediate hardware based monitoring nodes is provided. The method includes receiving at a first device an Internet Protocol (IP) frame sent from a second device to a third device wherein the first device is in a flow path between the second and third devices, the first device including at least one logic device. The method also includes removing an embedded Transmission Control Protocol (TCP) frame from the received IP frame with the logic device, supplying a client application with data from the removed protocol frame and sending an IP frame including the removed protocol frame to the third device from the first device after performing an analysis on the removed frame.

In another aspect, a method for identifying and selectively removing data on a data transmission system is provided. The method includes receiving at a first device an Internet Protocol (IP) frame sent from a second device to a third device wherein the first device is in a flow path between the second and third devices, the first device including at least one logic device, and actively dropping IP frames addressed to the third device sent by the second device such that the first device always has an accumulated in order content stream before the third device accumulates the in order content stream.

In yet another aspect, a dynamically reconfigurable data transmission system, having an apparatus including at least one input port, at least one output port, and at least one logic device operationally coupled to the input port and the output port. The logic device is configured to receive an Internet Protocol (IP) frame sent from a first device addressed to a second device, remove an embedded protocol frame from the received IP frame, and determine if the removed protocol frame includes Field Programmable Gate Array (FPGA) programming data. The logic device is also configured to supply a client application with data from the removed protocol frame when the removed protocol includes FPGA programming data such that the application receives a content stream in order, and send an IP frame including the removed protocol frame to the second device.

BRIEF DESCRIPTION OF THE DRAWINGS

FIG. 5 illustrates a plurality of workstations connected to a remote client across the Internet through a node including a TCP-Splitter coupled to a monitoring client application.

FIG. 6 illustrates a plurality of TCP-Splitter implemented FPX modules, as shown in FIGS. 3 and 4, in series between a programming device and a endpoint device forming a network.

DETAILED DESCRIPTION OF THE INVENTION

Figure 1:
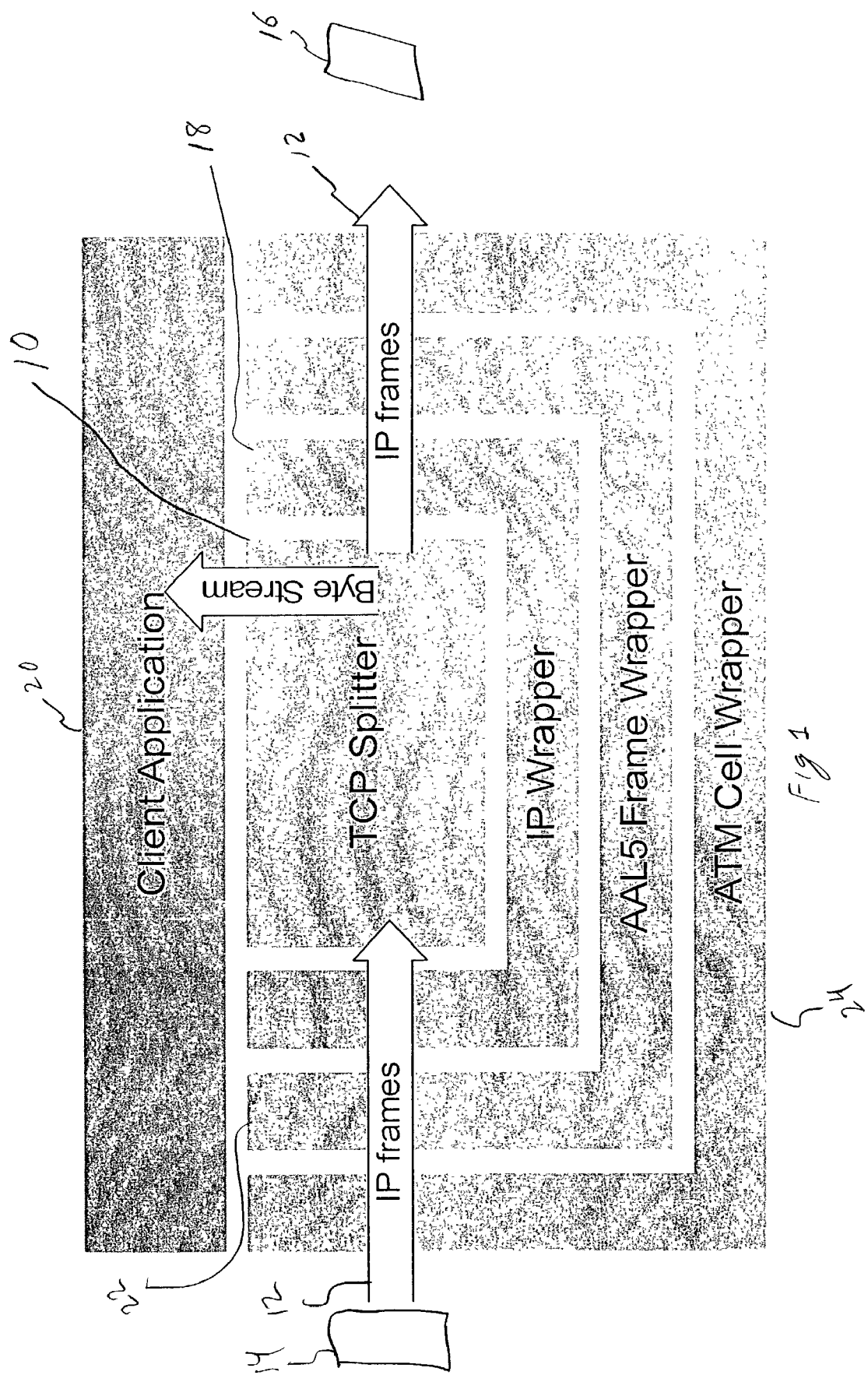
FIG. 1 is a high level view of the data flow through an embodiment of a TCP-Splitter.

FIG. 1 is a high level view of the data flow through an embodiment of a TCP-Splitter 10. A plurality of Internet Protocol (IP) frames 12 enter into TCP-Splitter 10 from a source device 14, and frames 12 are addressed to a destination device 16. IP frames 12 each include an IP header 18 and a TCP frame including a TCP header and a data packet. The TCP header is removed, the packet is classified to retrieve Flow State, and then the packet is sent as a byte stream to a client application 20. An IP frame including the embedded TCP frame is also sent to destination device 16. Accordingly, the splitting of the TCP frame from the IP frame is transparent to devices 14 and 16. In one embodiment, client application 20 counts how many bits are being transferred in a TCP exchange. Additionally, client application 20 is provided with TCP header information and/or IP header information, and in one embodiment, the header information is used to bill a user on a bit transferred basis. In another embodiment, client application 20 has access to reference data and, in real time, compares the byte stream of TCP transferred data provided to client application 20 with the reference data to provide a content matching such as, for example but not limited to, content matching as described in U.S. patent application Ser. No. 10/52,532 (which issued on Aug. 15, 2006 as U.S. Pat. No. 7,093,023) and U.S. patent application Ser. No. 10/037,593, which two patent documents are hereby incorporated by reference into the instant patent application in their entireties. In one embodiment, upon finding a particular match with a predefined reference data, TCP-splitter 10 stops all data flow from a particular IP address, all data flow to a particular IP address, and/or all data flow though TCP-splitter 10. In other embodiments, client application 20 monitors data through TCP-Splitter 10 for security purposes, for keyword detection, for data protection, for copyright protection, and/or for watermark detection (and/or other types of embedded digital signatures). In one embodiment, a delay is utilized such that the data is analyzed as described above before an IP frame including the removed TCP frame is sent to the destination device. Accordingly, TCP-Splitter 10 allows for actions to be taken in real time processing. In other words, TCP-Splitter 10 allows for arbitrary actions to be taken by the client application before the IP frame is sent to the destination device. These actions include delaying transmission of the IP frame and stopping transmission of the IP frame. Additionally, in some placements, IP frames 12 can be wrapped with other protocol wrappers such as an ATM Adaptation Layer 5 (AAL5) frame wrapper 22 and an Asynchronous transmission mode (ATM) Cell wrapper 24.

TCP-Splitter 10 is not implemented in software, rather TCP-Splitter 10 is implemented with combinational logic and finite state machines in a logic device. As used herein a logic device refers to an Application Specific IC (ASIC) and/or a Field Programmable Gate Array (FPGA), and excludes processors. In the FPGA prototype, TCP-splitter 10 processes packets at line rates exceeding 3 gigabits per second (Gbps) and is capable of monitoring 256 k TCP flows simultaneously. However, TCP-Splitter 10 is not limited in the number of simultaneous TCP flows TCP-Splitter 10 is capable of monitoring and while 256 k flows was implemented in the prototype built, additional flows can easily be monitored by increasing the amount of memory utilized. Additionally, TCP-splitter 10 delivers a consistent byte stream for each TCP flow to client application 20. As explained in greater detail below, TCP-splitter 10 processes data in real time, provides client application 20 the TCP packets in order, and eliminates the need for large reassembly buffers. Additionally, by providing the TCP content in order, TCP-Splitter facilitates keeping a minimal amount of state.

Figure 2:
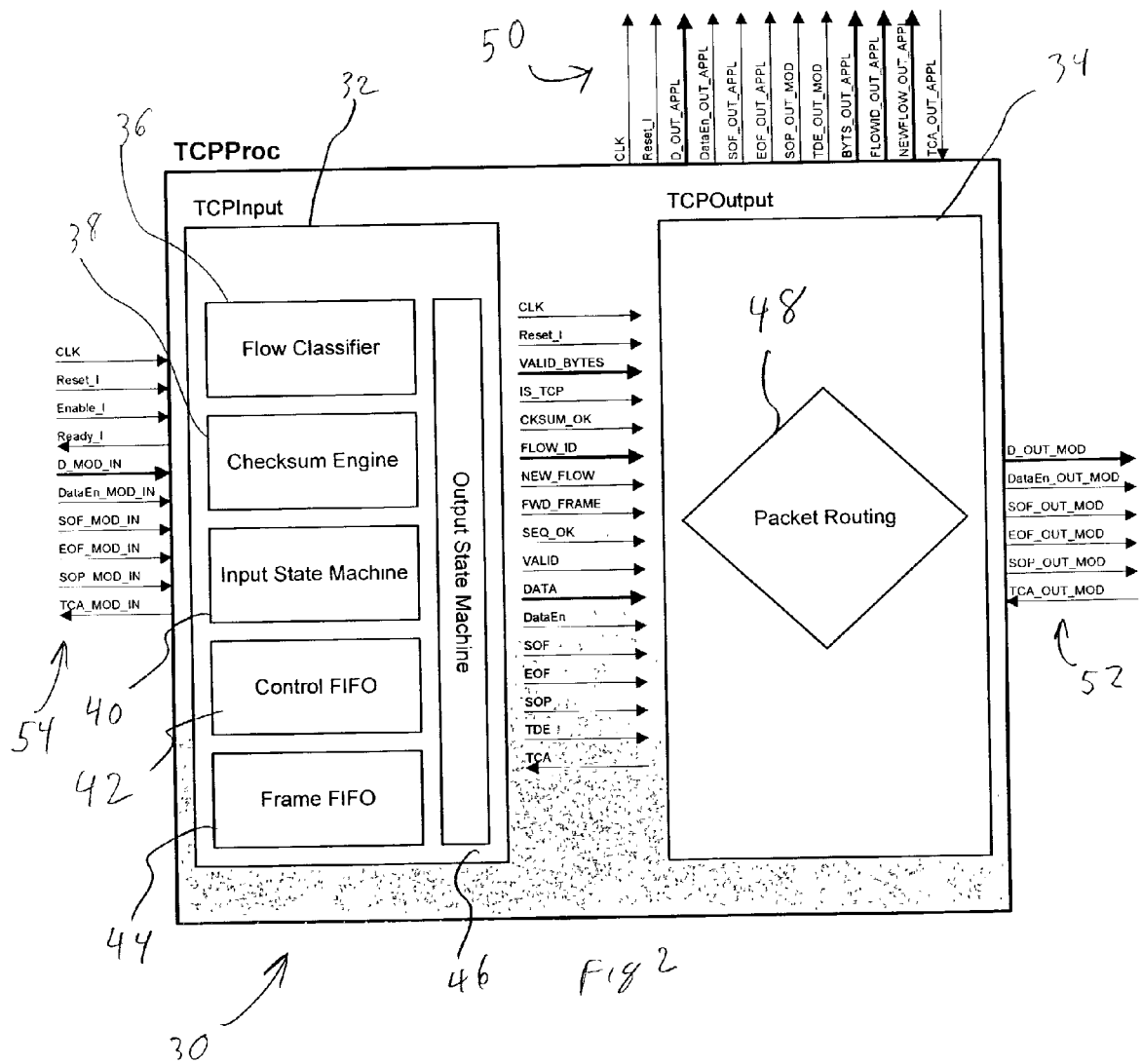
FIG. 2 is a low-level view of data flow though an embodiment of a TCP-splitter.

FIG. 2 is a low level view of data flow though an embodiment of a TCP-splitter 30 illustrating a TCP input section 32 and a TCP output sections 34. Input section 32 includes a Flow classifier 36, a Checksum Engine 38, an Input State Machine 40, a Control First In-First Out (FIFO) buffer 42, a Frame FIFO buffer 44, and an Output State Machine 46. TCP output section 34, includes a Packet Routing engine 48 operationally coupled to a Client Application 50 and an IP output stack 52.

In use, data is delivered to an input stack 54 operationally coupled to TCP input section 32. Flow Classifier 36, Checksum Engine 38, Input State Machine 40, Control FIFO 42, and Frame FIFO 44 all process IP packet data received from the IP protocol wrapper. Output State Machine 46 is responsible for clocking data out of the control and frame FIFOs 42 and 44, and into output section 34. The input interface signals to TCP-Input section 32 are as follows:

IN 1 bit clock

IN 1 bit reset

IN 32 bit data word

IN 1 bit data enable

IN 1 bit start of frame

IN 1 bit end of frame

IN 1 bit start of IP payload

IP frames are clocked into input section 32 thirty-two data bits at a time. As data words are clocked in, the data is processed by Input State Machine 40 and buffered for one clock cycle. Input State Machine 40 examines the content of the data along with the control signals in order to determine the next state.

The output of Input State Machine 40 is the current state and the corresponding data and control signals for that state. This data is clocked into Flow Classifier 36, Checksum Engine 38, and Frame FIFO 44.

Flow Classifier 44 performs TCP/IP flow classification, verifies the sequence number, and maintains state information for this flow. Output signals of Flow Classifier 44 are (1) a 1 bit indication of whether or not this is a TCP packet, (2) a variable length flow identifier (currently eighteen bits), (3) a 1 bit indication of whether of not this is a new TCP flow, (4) a 1 bit indication of whether or not this packet should be forwarded, (5) a 1 bit indication of whether the sequence number was correct, and (6) a 1 bit indication of the end of a TCP flow.

Checksum Engine 38 verifies the TCP checksum located in the TCP header of the packet. The output of the checksum engine is a 1-bit indication whether of not the checksum was successfully verified. Frame FIFO 44 stores the IP packet while Checksum Engine 38 and Flow Classifier 36 are operating on the packet. Frame FIFO 44 also stores a 1 bit indication of the presence of TCP data, a 1 bit indication of the start of frame, a 1 bit indication of the end of frame, a 1 bit indication of the start of the IP packet payload, a 1 bit indication of whether or not there is valid TCP data, and a 2 bit indication of the number of valid bytes in the data word. The packet is stored so that the checksum and flow classifier results can be delivered to the outbound section 34 along with the start of the packet.

Once the flow has been classified and the TCP checksum has been computed, information about the current frame is written to Control FIFO 42. This data includes the checksum result (pass or fail), a flow identifier (currently 18 bits), an indication of whether or not this is the start of a new flow, an indication of whether or not the sequence number matched the expected sequence number, a signal to indicate whether or not the frame should be forwarded, and a 1 bit indication of whether or not this is the end of a flow. Control FIFO 42 facilitates holding state information of smaller frames while preceding larger frames are still being clocked out of Frame FIFO 44 for outbound processing.

Output State Machine 46 is responsible for clocking data out of the Control and Frame FIFOs 42 and 44, and into output section 34 of TCP-Splitter 30. Upon detecting a non-empty Control FIFO 42, output state machine 46 starts clocking the next IP frame out of Frame FIFO 44. This frame data along with the control signals from Control FIFO 42 exit TCP-Input section 32 and enter TCP-Output section 34.

TCP-Splitter 30 uses a flow classifier that can operate at high speed and has minimal hardware complexity. In an exemplary embodiment a flow table with a 256 k element array contained in a low latency static RAM chip is used. Each entry in the table contains thirty-three bits of state information. An eighteen-bit hash of the source IP address, the destination IP address, the source TCP port, and the destination TCP port are used as the index into the flow table. The detection of a TCP FIN flag signals the end of a TCP flow and the hash table entry for that particular flow is cleared. Other classifiers can be used to identify traffic flows for TCP-Splitter 30. For example, SWITCHGEN (as described in "Pattern Matching in Reconfigurable Logic for Packet Classification", ACM Cases, 2001, A. Johnson and K. Mackenzie) is a tool which transforms packet classification into reconfigurable hardware based circuit design and can be used with TCP-splitter 30. A Recursive Flow Classification (RFC) algorithm can also be used with TCP-Splitter and is another high performance classification technique that optimizes rules by removing redundancy. The design of TCP-Splitter 30 does not impose any restrictions on the flow classification technique utilized and can be used with any flow classifier.

In an exemplary embodiment, output-processing section 34 of TCP-Splitter 30 is responsible for determining how a packet should be processed. The input interface signals to output section 34 are as follows:

IN 1 bit clock

IN 1 bit reset

IN 32 bit data word

IN 1 bit data enable

IN 1 bit start of frame

IN 1 bit end of frame

IN 1 bit start of IP payload

IN 1 bit TCP data enable

IN 2 bit number of valid data bytes

IN 1 bit TCP protocol indication

IN 1 bit checksum passed

IN 18 bit flow identifier

IN 1 bit new flow indication

IN 1 bit forward frame indication

IN 1 bit correct sequence number

IN 1 bit data is valid

IN 1 bit end of flow

There are three possible choices for packet routing. Packets can be (1) passed on to the outbound IP stack only, (2) passed both to the outbound IP stack and to client application 50, or (3) discarded (dropped). The rules for processing packets are as follows:

All non-TCP packets (i.e., classified as non-TCP) are sent to the outbound IP stack.

All TCP packets with invalid checksums (i.e., classified as invalid TCP checksum) are dropped.

All TCP packets with sequence numbers less than the current expected sequence number (i.e., classified as sequence number less than expected) are sent to the outbound IP stack.

All TCP packets with sequence numbers greater than the current expected sequence number (i.e., classified as sequence number greater than expected) are dropped (i.e., discarded and not sent to either client application 50 or the outbound IP stack).

All TCP synchronization (TCP-SYN) packets are sent to the outbound IP stack.

All other packets (classified as else) are forwarded both to the outbound IP stack and client application 50. Note that when the TCP packet has a sequence number equal to expected and has a valid checksum, then that packet is classified as else and sent to the outbound IP stack as well as to client application 50.

A client interface (not shown) is between client application 50 and TCP output section 34. The client interface provides a hardware interface for application circuits. Only data that is valid, checksummed, and in-sequence for each specific flow is passed to client application 50. This allows the client to solely process the consistent stream of bytes from the TCP connection. All of the packet's protocol headers are clocked into client application 50 along with a start-of-header signal so that the client can extract information from these headers. This eliminates the need to store header information, but still allows the client access to this data. Client application 50 does not sit in the network data path and therefore does not induce any delay into the packets traversing the network switch. This allows the client application to have arbitrary complexity without affecting the throughput rate of TCP-splitter 30. The client interface contains the following signals:

IN 1 bit clock

IN 1 bit reset

IN 32 bit data word

IN 1 bit data enable

IN 1 bit start of frame

IN 1 bit end of frame

IN 1 bit start of IP payload

IN 1 bit TCP data enable

IN 2 bit number of valid data bytes

IN 18 bit flow identifier

IN 1 bit new flow indication

IN 1 bit end of flow

OUT 1 bit flow control

Client application 50 can generate a flow control signal that will stop the delivery of cells. In one embodiment, this signal is not processed by TCP-Splitter 30, but is passed on to the IP wrapper driving the ingress of IP packets. In another embodiment, this signal is processed by TCP-Splitter 30.

In the embodiment where TCP-Splitter 30 does not process the flow control signals, there is a delay in the cessation of the flow of data words into client application 50 while the flow control signal is being processed by the lower protocol layers. Since TCP-Splitter 30 does not act upon the flow control signal, data continues to flow until all buffers of TCP-Splitter 30 are empty. Client application 50 is configured to either handle data at line rates or is capable of buffering 1500 bytes worth of data after the flow control signal is asserted.

Because Transmission Control Protocol/Internet Protocol (TCP/IP) is the most commonly used protocol on the Internet, it is utilized by nearly all applications that require reliable data communications on a network. These applications include Web browsers, FTP, Telnet, Secure Shell, and many others. High-speed network switches currently operate at OC-48 (2.5 Gb/s) line rates, while faster OC-192 (10 Gb/s) and OC-768 (40 Gb/s) networks are on the horizon. New types of networking equipment require the ability to monitor and interrogate the data contained in packets flowing through this equipment. TCP-Splitter 30 provides an easily implementable solution for monitoring at these increased bandwidths.

In one embodiment, and as explained in greater detail below, TCP-Splitter 30 provides a reconfigurable hardware solution which provides for the monitoring of TCP/IP flows in high speed active networking equipment. The reconfigurable hardware solution is implemented using Very High Speed Integrated Circuit (VHSIC) Hard-ware Description Language (VHDL) for use in ASICs or Field Programmable Gate Arrays (FPGAs). The collection of VHDL code that implements this TCP/IP monitoring function is also called TCP-Splitter in addition to the hardware itself (i.e., 10 and 30). This name stems from the idea that the TCP flow is being split into two directions. One copy of each network data packet is forwarded on toward the destination host. Another copy is passed to a client application monitoring TCP/IP flows. In an alternative embodiment, the copy that is passed to the client application is rewrapped with an IP wrapper to form an IP frame that is forwarded to the destination host. In order to provide for the reliable delivery of a stream of data into a client application, a TCP connection only needs to be established that transits through the device monitoring the data. The bulk of the work for guaranteed delivery is managed by the TCP endpoints, not by the logic on the network hardware. This eliminates the need for a complex protocol stack within the reconfigurable hardware because the retransmission logic remains at the connection endpoints, not in the active network switch.

TCP-Splitter 30 is a lightweight, high performance circuit that contains a simple client interface that can monitor a nearly unlimited number of TCP/IP flows simultaneously. The need for reassembly buffers is eliminated because all frames for a particular flow transit the networking equipment in order. Because there is no guarantee that TCP frames will traverse the network in order, some action will have to take place when packets are out of order. As explained above, by actively dropping out of order packets, a TCP byte stream is generated for the client application without requiring reassembly buffers. If a missing packet is detected, subsequent packets are actively dropped until the missing packet is retransmitted. This ensures in-order packet flow through the switch. Therefore a monitoring device always has an accumulated in order content stream before a destination device accumulates the in order content stream.

This feature forces the TCP connections into a Go-Back-N sliding window mode when a packet is dropped upstream of the monitoring node (e.g., the node where TCP-Splitter is positioned). The Go-Back-N retransmission policy is widely used on machines throughout the Internet. Many implementations of TCP, including that of Windows 98, FreeBSD 4.1, and Linux 2.4, use the Go-Back-N retransmission logic. The benefit on the throughput is dependent on the specific TCP implementations being utilized at the endpoints. In instances where the receiving TCP stack is performing Go-Back-N sliding window behavior, the active dropping of frames may improve overall network throughput by eliminating packets that will be discarded by the receiver.

Typically, TCP-Splitter 30 is placed in the network where all packets of monitored flows will pass. All packets associated with a TCP/IP connection being monitored then passes through the networking node where monitoring is taking place. It would otherwise be impossible to provide a client application with a consistent TCP byte stream from a connection if the switch performing the monitoring only processed a fraction of the TCP packets. In general, this requirement is true at the edge routers but not true for interior nodes of the Internet. This strategic placement of TCP-Splitter can be easily accomplished in private networks where the network has been designed to pass traffic in a certain manner.

Figure 3:
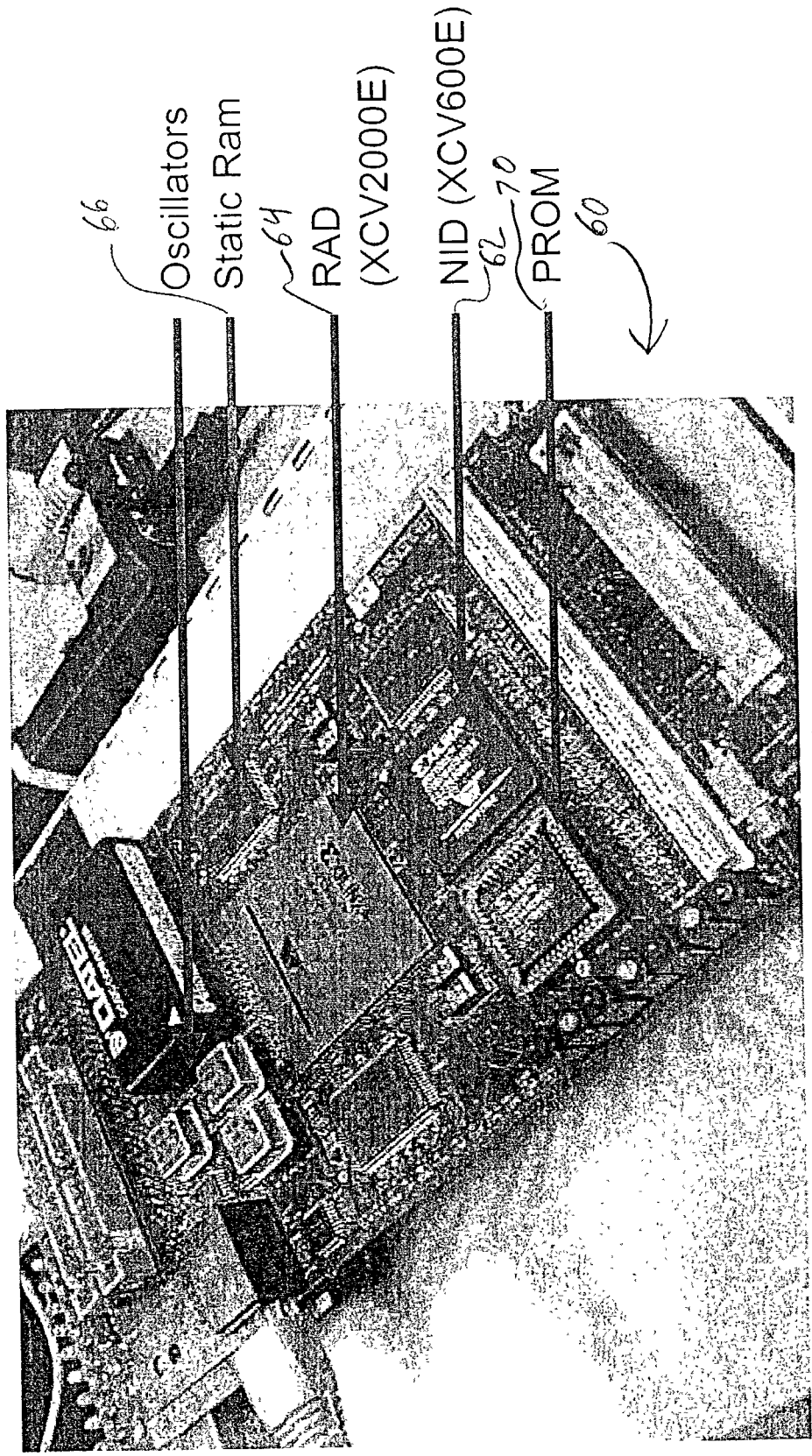
FIG. 3 is a perspective view of a Field-programmable Port Extender (FPX) module.
Figure 4:
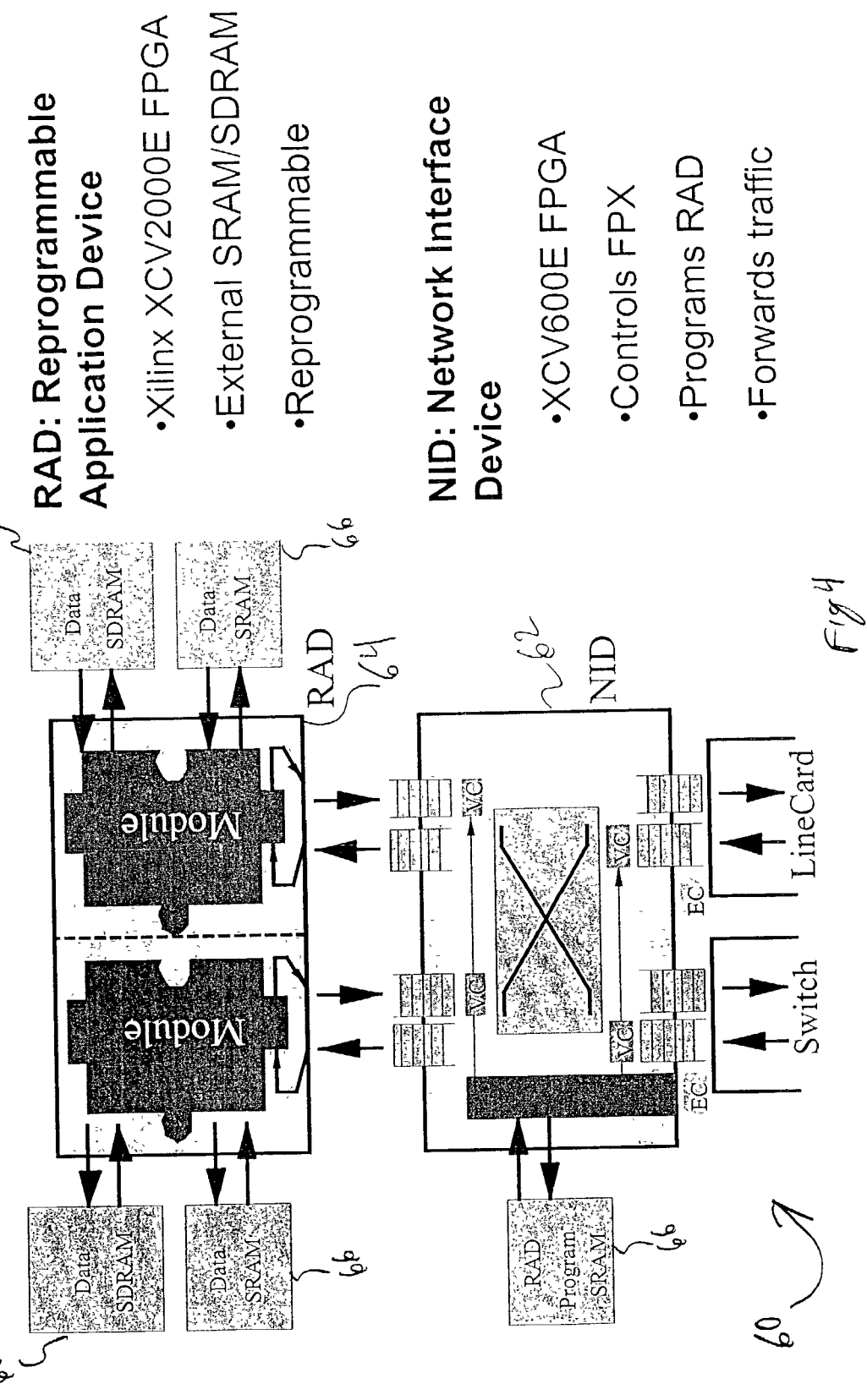
FIG. 4 is a schematic view of the FPX module shown in FIG. 3.

FIG. 3 is a perspective view and FIG. 4 is a schematic view of a Field-programmable Port Extender (FPX) module 60 configured to implement a TCP-Splitter as described above. Module 60 includes a Network Interface Device (NID) 62 operationally coupled to a Reprogrammable Application Device (RAD) 64. NID 62 is configured to program and/or reprogram RAD 64. Module 60 also includes a plurality of memories including a static RAM 66, a Synchronous DRAM 68, and a PROM 70 operationally coupled to at least one of NID 62 and RAD 64. In an exemplary embodiment, NID 62 includes a FPGA such as a XCV600E FPGA commercially available from Xilinx, San Jose Calif., and RAD 64 includes a FPGA such as a XCV2000E FPGA also available from Xilinx.

In use, module 60 monitors network traffic and send TCP data streams to a client application in order. Because module 60 implements the TCP-Splitter in a FPGA, upon receipt of FPGA programming data the TCP-Splitter can reprogram itself and send the FPGA programming data to other TCP-splitters in a flow path between a sending device and a destination device. Additionally, module 60 can reprogram the router to process the traffic flow differently than before. Also, because the data is passed along to other TCP-Splitters, the overall QoS of a network is quickly and easily changeable. In other words, QoS policies, as known in the art, are easily and quickly changed in networks including a TCP-Splitter as herein described. Accordingly, the reprogrammed router prioritizes network traffic based on the flow. Additionally, the TCP-Splitter can include a plurality of reprogrammable circuits such as FPGAs and can monitor the TCP flows for different things substantially simultaneously. For example, one flow contains data in order for a client application to count bits, while another flow contains data in order for another client application to perform content matching, while another flow contains data for reprogramming an FPGA. Also, a plurality of FPGAs can be coupled to each other such that upon receipt by at least one of an ASIC and a FPGA of FPGA programming data, the ASIC or FPGA receiving the data uses the data to reprogram the FPGAs.

FIG. 5 illustrates a plurality of workstations 80 connected to a remote client 82 across the Internet 84 through a node 86 including a TCP-Splitter (not shown in FIG. 4) coupled to a Monitoring client application 88. All traffic from remote client 82 or any other device on the Internet 84 to or from workstations 80 passes through node 86 and is monitored with the TCP-Splitter coupled to client application 88.

FIG. 6 illustrates a plurality of TCP-Splitter implemented FPX modules 60 (Shown in FIGS. 3 and 4) in series between a programming device 90 and an endpoint device 92 forming a network 94.

In use, programming device 90 transmits programming data via a stream-oriented protocol using the Internet Protocol (IP) to send the data to endpoint device 92. Each FPX module 60 receives a plurality of IP frames addressed to endpoint device 92, removes the embedded stream-oriented protocol frame from the IP frame, and provides a client application the removed stream-oriented protocol frame. Each FPX module 60 sends an IP frame including the removed protocol frame back onto network 92. Accordingly, with one transmission stream made from programming device 90 to endpoint device 92, a plurality of intermediate devices (modules 60) receive programming data either to reprogram themselves (modules 60) or to reprogram any attached devices. Because the programming data is split (i.e., sent to the client application and sent back on network 94 addressed to endpoint device 92), TCP-Splitter imparts the ability to easily and quickly reconfigure a network of any size. As used herein, a stream-oriented protocol refers to all protocols that send data as a stream of packets such as TCP as opposed to non-stream-oriented protocols such as UDP where a single packet contains the entire message.

While the invention has been described in terms of various specific embodiments, those skilled in the art will recognize that the invention can be practiced with modification within the spirit and scope of the claims.

What is claimed is:

1. A method for identifying and selectively removing data on a data transmission system, said method comprising:

receiving a data stream at a first device, said first device comprising a logic device, said data stream comprising a plurality of Internet Protocol (IP) frames sent from a second device and addressed to a third device, wherein the first device is in a flow path between the second device and the third device;

accumulating an in-order data stream at the first device by actively dropping out-of-order IP frames received from the second device;

removing an embedded protocol frame from a received IP frame;

supplying a computer-implemented client application with data from the removed protocol frame;

analyzing data supplied to the computer-implemented client application; and sending the received IP frame including the embedded protocol frame to the third device after analyzing the data.

2. The method of claim 1, further comprising:

determining validity of a checksum of a header of the removed protocol frame;

dropping the received IP frame when the checksum is invalid;

supplying a client application with data from the removed protocol frame when the checksum is valid; and sending the received IP frame and the removed protocol frame to the third device when the checksum is valid.

3. The method in accordance with claim 2 wherein sending the received IP frame and the removed protocol frame comprises:

classifying the removed protocol frame as having a sequence number from the group of sequence numbers consisting of: greater than an expected classification, equal to the expected classification, and less than the expected classification;

sending the received IP frame and the removed protocol frame to the third device when the sequence number is not greater than the expected classification; and dropping the received IP frame and the removed protocol frame when the sequence number is greater than the expected classification.

4. The method in accordance with claim 2 wherein removing an embedded protocol frame from the received IP frame comprises the step of the logic device removing a Transmission Control Protocol (TCP) frame from the received IP frame.

5. The method in accordance with claim 2 further comprising classifying the removed protocol frame as having a sequence number from at least one of the following groups of sequence numbers: greater than an expected classification, less than the expected classification, an invalid Transmission Control Protocol (TCP) checksum classification, a non-TCP classification, a TCP synchronization (TCP SYN) classification, and an else classification.

6. The method in accordance with claim 5 wherein supplying the client application with data from the removed protocol frame comprises supplying the client application with data from the removed protocol frame when the classification is an else classification.

7. The method in accordance with claim 5 wherein sending the received IP frame and the removed protocol frame to the third device occurs when the classification is one of non-TCP, TCP SYN, the sequence number being less than the expected classification, and an else classification.

8. The method in accordance with claim 5 further comprising dropping the received IP frame when the classification is one of invalid TCP checksum and sequence number being greater than the expected classification.

9. The method in accordance with claim 5 wherein supplying the client application with data from the removed protocol frame comprises providing content of a Transmission Control Protocol (TCP) stream to the client application in order.

10. The method in accordance with claim 5 wherein supplying the client application with data from the removed protocol frame comprises counting bits with data from the removed protocol frame.

11. The method in accordance with claim 5 wherein supplying the client application with data from the removed protocol frame comprises comparing the supplied data with reference data to perform content matching.

12. The method in accordance with claim 5 wherein supplying the client application with data from the removed protocol frame when the checksum is valid comprises supplying FPGA programming data.

13. An apparatus comprising:
at least one input port;
at least one output port; and
at least one logic device operationally coupled to said input port and to said output port, said logic device configured to:
receive an Internet Protocol (IP) frame sent from a second device addressed to a third device;
remove an embedded protocol frame, said embedded protocol frame comprising a header and a data packet, from the received IP frame;
send the data packet from the removed protocol frame to a computer-implemented client application for analysis; and
send the received IP frame including the embedded protocol frame to the third device.

14. The apparatus of claim 13, further comprising at least one reprogrammable device operationally coupled to the logic device, said logic device being configured to:
determine whether the removed protocol frame includes programming data; and
reprogram said reprogrammable device when the removed protocol frame contains programming data.

15. The apparatus of claim 13, wherein the logic device is further configured to:
determine whether data within the removed protocol frame represents at least part of a quality of service (QoS) algorithm; and
supply a client application with data from the removed protocol frame when said data represents at least part of a QoS algorithm.

* * * * *